(12) United States Patent
Degaugue et al.

(10) Patent No.: US 10,489,837 B2
(45) Date of Patent: *Nov. 26, 2019

(54) SYSTEM AND METHOD FOR FACILITATING TRANSACTIONS AS CONVERSATIONS BETWEEN PARTICIPANTS

(71) Applicant: Instaply, Inc., San Francisco, CA (US)

(72) Inventors: Fabien Ghislain Degaugue, Sausalito, CA (US); Yevgeniy Eugene Shteyn, Cupertino, CA (US)

(73) Assignee: Instaply, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,554

(22) Filed: Jan. 12, 2017

(65) Prior Publication Data

US 2017/0134334 A1 May 11, 2017

Related U.S. Application Data

(63) Continuation of application No. 14/286,907, filed on May 23, 2014, now Pat. No. 9,548,957.

(60) Provisional application No. 61/827,494, filed on May 24, 2013.

(51) Int. Cl.
  *G06F 15/16* (2006.01)
  *G06Q 30/06* (2012.01)
  *H04L 12/58* (2006.01)
  *G06T 11/20* (2006.01)

(52) U.S. Cl.
  CPC ........ *G06Q 30/0613* (2013.01); *G06T 11/206* (2013.01); *H04L 51/16* (2013.01); *H04L 51/34* (2013.01)

(58) Field of Classification Search
  CPC ........ H04L 51/10; H04L 51/16; H04L 51/34; H04L 51/00
  USPC .................................................. 709/203, 206
  See application file for complete search history.

(56) References Cited

U.S. PATENT DOCUMENTS

| | | |
|---|---|---|
| 7,149,724 B1 | 12/2006 | Flanagan et al. |
| 2001/0037315 A1 | 11/2001 | Saliba et al. |
| 2007/0112671 A1* | 5/2007 | Rowan .................. G06Q 20/10 705/39 |
| 2009/0228264 A1 | 9/2009 | Williams et al. |
| 2010/0100737 A1 | 4/2010 | Chapman |
| 2012/0303522 A1 | 11/2012 | May et al. |

(Continued)

OTHER PUBLICATIONS

International Searching Authority, International Search Report and Written Opinion, PCT Application PCT/US2014/039445, dated Oct. 16, 2014, 7 pages.

*Primary Examiner* — Frantz B Jean
(74) *Attorney, Agent, or Firm* — Perkins Coie LLP

(57) ABSTRACT

A computer-implemented system keeps records of communications between participants as a conversation. All communications between participants in a transaction are stored as part of the conversation including documents, photographs, forms etc. needed to complete the transaction. A computer system interacts with a wallet service of one or more participants to keep a record of, or to affect the transfer of, consideration between participants in the transaction. Conversations can occur for any topic or conversations for a particular topic can be selected and a template provided for documents and/or conversation participants most often needed to complete an associated transaction.

20 Claims, 12 Drawing Sheets

(56) References Cited

U.S. PATENT DOCUMENTS

| | | |
|---|---|---|
| 2013/0198296 A1 | 8/2013 | Roy et al. |
| 2014/0108288 A1 | 4/2014 | Calman et al. |
| 2014/0136346 A1 | 5/2014 | Teso |

\* cited by examiner

SYSTEM AND METHOD FOR FACILITATING TRANSACTIONS AS CONVERSATIONS BETWEEN PARTICIPANTS

CROSS-REFERENCE TO RELATED APPLICATION(S)

The present application is a continuation of U.S. patent application Ser. No. 14/286,907, filed May 23, 2014, and claims the benefit of, and priority to, U.S. Patent Application No. 61/827,494 filed on May 24, 2013, both of which applications are herein incorporated by reference in their entireties.

TECHNICAL FIELD

The technology described herein relates to computers systems and in particular to computer systems to facilitate transactions between users.

BACKGROUND

For anything but the most simple of transactions, a person often uses multiple electronic devices to communicate with several parties in order to complete a transaction. For example, in the case of an automobile accident, a party may need to involve the police, witnesses, car body repair shops, insurance agencies, attorneys and maybe others to settle a claim and repair a car. Letters drafted on computers are sent between parties, phone calls are made, e-mails are sent. A user has to keep track of all these communications in order to make sure that the underlying issues are resolved.

Given the complexity of tracking, storing and analyzing records of each of these communications, there is a need for a system that can help reduce transaction costs by facilitating communications between parties about a transaction in order see a transaction through to its completion.

SUMMARY

As will be discussed in further detail below, the technology disclosed is a computer-based system that groups communications between users as a conversation. A conversation can store records of communications between multiple parties and the documents that are transmitted between parties. A user can easily view previously started conversations and add to them in order to complete some desired task. The computer system records a result of the conversation and can rate participants in the conversation on how effective the participants were in achieving the completion of a task or assignment that was the subject of the conversation. In addition, the computer system can facilitate the transfer of consideration between one or more participants in a conversation in order to complete a transaction. Furthermore, the computer system can simplify analysis of transactions and suggest efficient communication templates.

DETAILED DESCRIPTION

Figure 1:
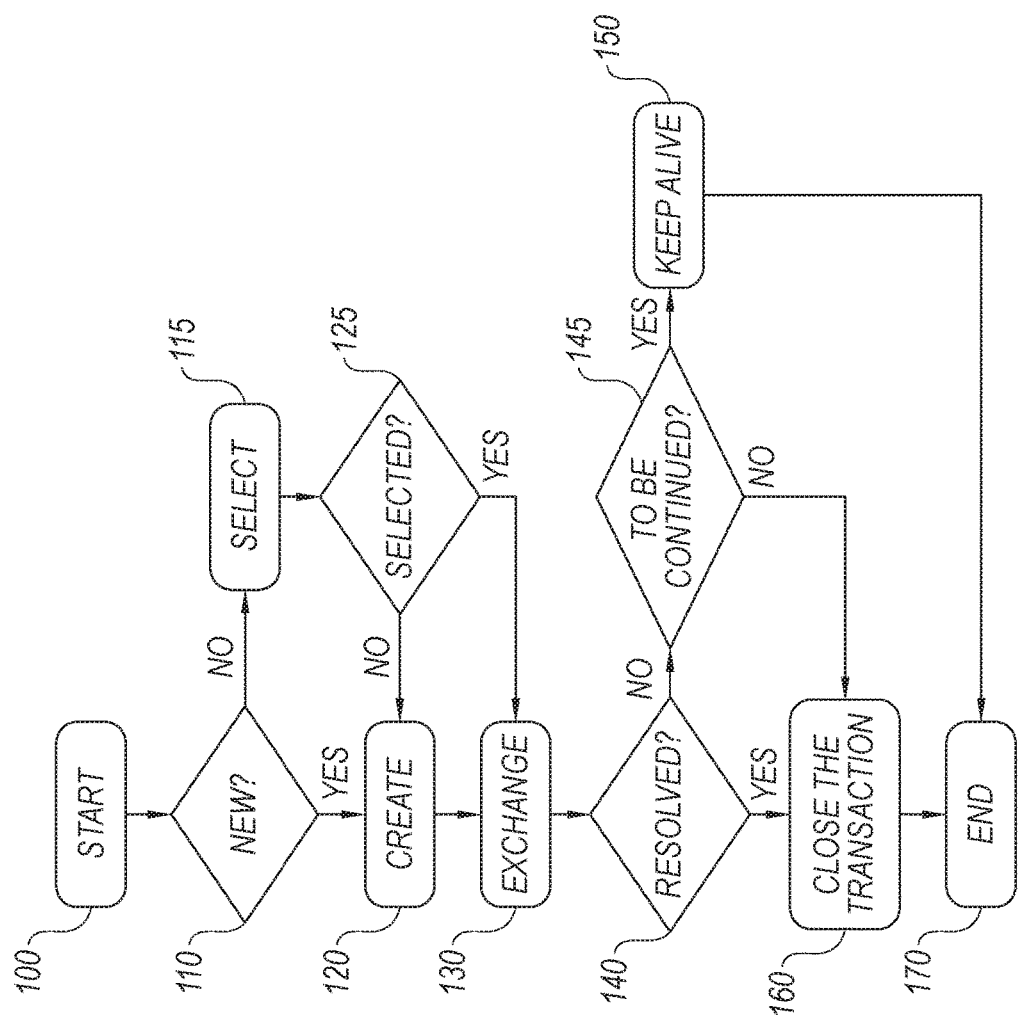
FIG. 1 is a block diagram of a top level conversation process.

As discussed above, the purpose of the system described herein is to facilitate collaboration and transactions between participants in a commercial, governmental, non-profit, social, etc. setting. These transactions can include, but are not limited to, negotiating a purchase, contract, and/or commitment, providing a service, effecting a customer support session, arriving at an agreement between people on a future course of action, resolving an issue, developing an idea, prioritizing action items, assembling a document and/or document package to support a claim, etc.

A computer system keeps records of transactions as a conversation between participants. Communications between participants include streams of information exchanges comprising fragments, e.g. text messages, pictures, requests, orders, promises, location information, delivery options, comments, questions, legal documents, schedules, money, etc. A transaction can include the exchange of goods, services, information, considerations, promises, etc.

Participants in a conversation can include teams and individuals (e.g. team-team; team-individual; individual-individual). Teams can be formal and informal entities, formal/Legal (Corporations, Universities, Governments, Families) or informal (Friends, Acquaintances, Extended Family, Co-workers, Countrymen, etc.). Individuals can be human, animal, and artificial (e.g. automated services).

Conversations can be new, continuing or recurring.

Depending on the nature of the transaction, teams, and individuals involved, individuals and teams can be assigned different "hats", e.g. customer, husband, employee, contractor, advisor, authorized agent, boyfriend, team member, calendar, etc. More than one "hat" can be assigned to an individual or a team at the same time.

To explore the feasibility and/or conduct a transaction, parties create at least one conversation and invite teams and individuals to discuss or join the conversation as appropriate.

Conversations occur between individuals, but, depending on the "hats" assigned to the individuals, teams can own and participate in the conversations.

In one embodiment, a computer system stores records of free-form conversations where the users are invited to define the participants in the conversation, the documents to be transmitted or communications to be sent between participants. In another embodiment, the computer system provides templates for transactions and related conversations to handle pre-defined scenarios, e.g. an Auto Accident Insurance Claim, Airport Arrival, Service Sign-up, New Hire, Apartment Rental, Contract Negotiations, Product/Service Delivery, Product/Service Feedback, Customer Support, etc. Users of the system are enabled to use default templates or create their own. Furthermore, the system can rate templates with regard to the efficiency of completed transactions.

In one embodiment, individuals and teams are introduced to each other via a "Say Hi" mechanism. The mechanism makes one party (individual or team) aware of another party, which becomes a potential transaction partner, e.g. in a pre-defined scenario.

Parties in a transaction engage in conversations that involve an offerable (product, service, experience, etc.), its description, price, invitations to make an offer (advertisement), conditions of sale, availability, quality, delivery options, distribution of money between parties, contract terms, complaints, etc.

A conversation can be split into multiple conversation streams and routed to different teams and individuals.

Records of conversations are stored and analyzed to evaluate transaction efficiency, value creation, satisfaction, team/individual performance, dispute arbitration, etc.

Parties in the transaction are enabled to allocate and distribute money or equivalent consideration between themselves and third parties. The money or its equivalent exchanged during the conversation may represent an official record of receipt. The money can be transferred through various mechanisms, e.g. a digital wallet service, which is tied to the user's bank account, credit card account, Amazon Flexible Payment System (Amazon FPS), PayPal, BitCoin, frequent flier, affiliation card, etc.

The system keeps records, including time and location stamps, of individuals, teams, conversations, relationships, transactions, etc.

In one embodiment, the computer system provides Application Programming Interfaces (APIs) to third parties programs that desire access to the conversation in real-time and/or related records through a database.

The system and third parties may exchange identifying information that allows them to match (e.g. positively, negatively, partially, individually, in aggregate) teams, individuals, transactions, conversations, etc.

The system and third parties may exchange the contents of conversations and related meta-data, such as date, time, response time, number of parties involved, number of conversation branches, considerations transferred, participants' and observers' subjective evaluation of the transaction efficiency, emotional markers, etc.

The following is a non-exhaustive list of sample transactions for which a user may wish to maintain a record of a conversation: service registration (Say Hi); auto accident claim; airport arrival; new hire onboarding; new employee orientation; signing up for health benefits; buying a mobile phone with a carrier contract; buying, delivering, installing, repairing, replacing a heater for the house; employee/team performance evaluation; filing a medical insurance claim; ordering a meal, paying, and giving a tip at a restaurant; disputing a service bill; requesting legal advice; delegation of authority during vacation; test performance discussion between student, parent, teacher, tutor, and school principal; getting advice from a store employee and/or another consumer with proven product/service experience; and contacting distant relatives in a foreign city.

Human interactions about private, pubic, and commercial matters typically involve multiple information exchanges that comprise objective and subjective data. The exchanges take place between people, organizations, and/or automated systems that help facilitate transactions make them less expensive, e.g. in terms of time, money, and efforts of the parties involved. The exchanges can be thought of as virtual assembly lines for services. When an individual service fails to be delivered in the right place, at the right time, in the right quality and quantity, the entire assembly line stops, resulting in increased transaction costs.

For example, a purchase of a product on a website may include at least some of the following operations: browsing product-related web pages, reading reviews, comparing competing and/or related product offerings, receiving product description and pricing information, filling out order information, submitting an order, paying, tracking the order, providing feedback on product and/or service quality, contacting customer service, resolving disputes, returning the product, e.g. when it doesn't satisfy one's needs, etc.

In another example, fixing one's car after an auto accident may involve but not limited to interactions with relatives, insurance companies, police, witnesses, other parties in the accident and/or their agents, auto repair shops, information services, emergency assistance services, courts, etc. The process includes collecting various documents, submitting them in accordance with pre-defined rules or procedures, obtaining or paying money, etc. It gets even more complicated when the accident involves medical claims because yet more parties have to be included in resolving the issue.

In a yet another example, encountering a new situation, such as arriving at an airport in a foreign city or starting a new job, may require discovering new information sources, accessing new services, acquiring new contacts, fulfilling new roles in transaction processes, entering new types of negotiations, and much more.

As more people use mobile device and related communication services, it becomes more difficult to address issues mentioned above using traditional web, voice, e-mail, SMS, and other modes of interaction. One purpose of the disclosed technology is to facilitate collaboration and enable efficient interaction in a broad variety of human environments: commercial, governmental, social, non-profit, etc.

Another purpose of the disclosed technology is to facilitate commercial transactions between individuals and businesses that involve use of mobile connected devices.

Yet another purpose of the disclosed technology is to facilitate distribution of value among parties involved in commercial transactions and providing means for evaluating efficiency and value creation among employees and businesses involved in the transactions.

These and other advantages of the disclosed technology are accomplished by providing a system for conversation creation and management. A conversation is represented by a stream of messages generated by and distributed over a relationship graph. The system further enables insertion into the conversation representations of value, e.g. money or tokens, and means for distributing the value among the participants of the conversation.

FIG. 1 is a block diagram of a top level conversation process.

At step 100, the system starts the conversation, e.g. by launching an mobile application and initializing user environment with previous conversations, potential relevant contacts, value holders, connections to services, and other elements necessary to engage in a transaction.

At step 110, the system decides whether the user is going to continue an existing conversation, or create a new one. If the user chooses "New," e.g. pressing a corresponding icon on his or her user interface, the system goes to step 120. Alternatively, step 110 can be performed by the system automatically, depending on the context of the application, e.g. when the user opens up the application for the first time for registration.

If the "New" option is rejected in step 110, the system tries to select an existing conversation for the user to continue. If the process of selection succeeds, the system goes to step 130 where the parties involved engage in an information exchange. Otherwise, the system creates a new conversation at step 120. Each conversation has a unique identifier. The identifier can be generated explicitly, e.g. by generating a unique number, or implicitly by a combination of conversation attributes, e.g. concatenation of names of parties involved in the conversation and a random hash code.

Step 130 may proceed in real time or over an extended period of time, where parties exchange messages asynchronously.

In some implementations, the strength of the connection between conversation participants determines when and how messages are delivered. For example, if a particular employee (or team member) contacted by a customer is not available, the customer's request can be either forward or escalated to other employees (team members) or not.

The customer and team member are enabled to "lock" their relationships, e.g. for a period of time. For example, only a specific Financial Advisor is allowed to reply to investment portfolio allocation questions within two days, provided the advisor is still available. The "lock", e.g. exclusivity of the relationship and its duration, can be determined in different ways.

In one implementation, the customer and/or team member explicitly define the terms of the relationship through their preferences.

In another implementation, the systems determines the terms by monitoring user interactions and calculating preferences, e.g. based on the number of interactions, their frequency, customer satisfaction statistics, and consideration exchanged.

In a yet another implementation, the system determines "lock" characteristics on a per-conversation or even per-message bases, e.g. asking the customer and/or team member whether at least one of them wishes to maintain the "lock" or exclusive conversation with the customer.

In one more implementation, the system escalates a conversation if the customer accesses it in an emergency mode.

When a "lock is not present", a team receptionist (either human or automatic) is enabled to steer the conversation to an available team member. For example, when a new customer contacts Macy's sales service for the first time, the conversation is not locked. In another example, a sales rep at Macy's manages her own customer base. She does "clienteling" with top customers and keeps ownership of their customer base.

At step 140, the system decides whether the subject of the conversation has been resolved. If yes, the system marks the conversation as dosed at step 160.

In some implementations, conversation parties are enabled to explicitly propose a closure, e.g. by pressing a "handshake" button. For example, when a deal is reached, the user presses the button thus confirming the conditions of a sale. The closure can be linked to a transfer of consideration via, e.g. a digital wallet service, implemented either as hardware, software, or a combination of both.

Various user interface elements, e.g. icons, voice commands, gestures, etc. can be used to declare the outcome of the conversation.

Similarly, the user can be prompted by another party to dose the deal with a standard or customized user interface element, e.g. "Do you agree?" button.

Otherwise, at step 145 the system tries to determine whether the conversation is going to be continued. For example, parties may decide to continue their conversation at a later time. If that's the case, the conversation is kept alive, e.g. by assigning it an "alive" attribute and storing it in a database.

Otherwise, from step 145, the system proceeds to dose the transaction at step 160. The process ends at step 170, with the conversation either dosed or kept alive.

Figure 2:
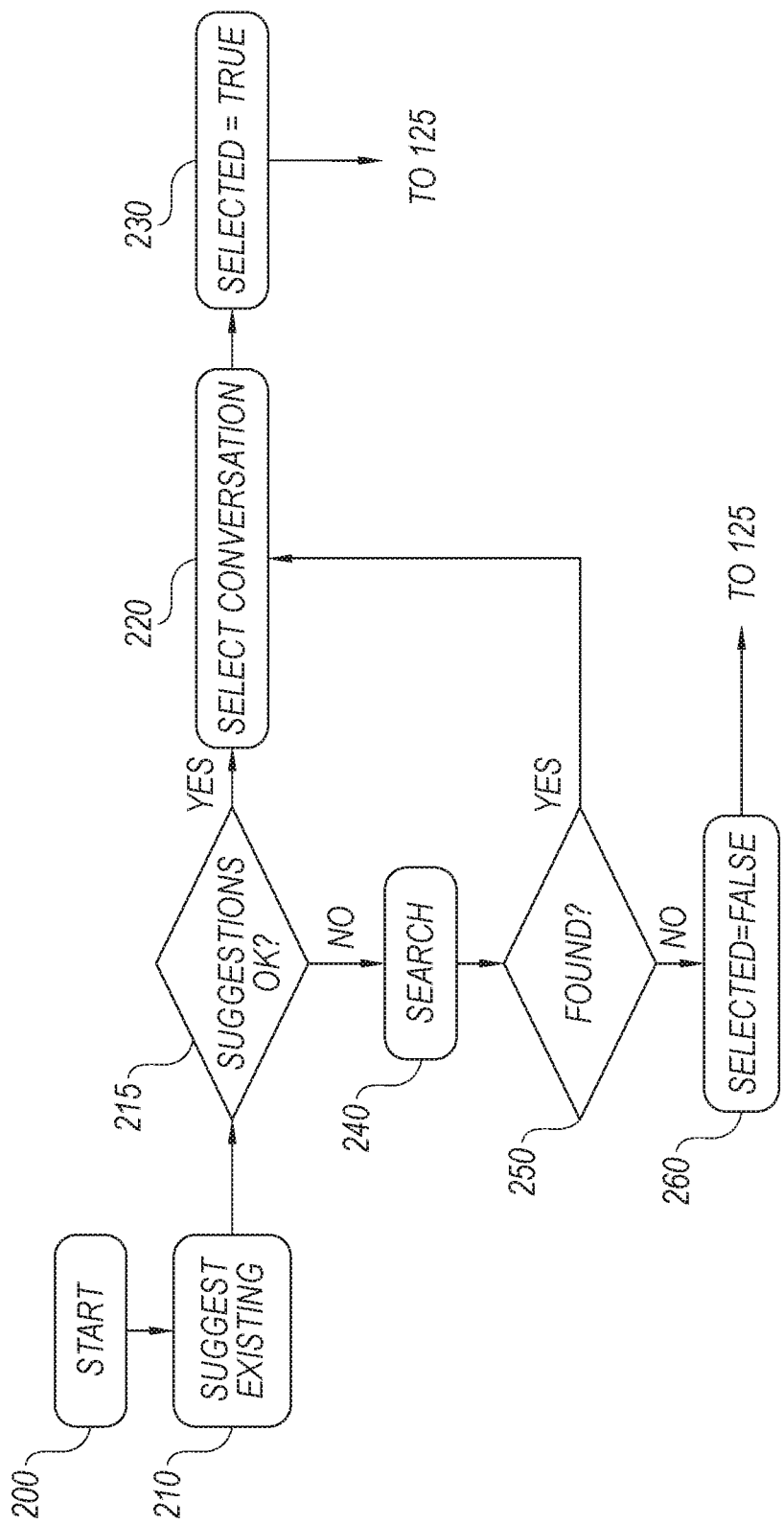
FIG. 2 is a block diagram of a process for conversation selection.

FIG. 2 is a block diagram of the process for conversation selection at step 115.

The process begins with initializing the system with existing live conversations—step 200, e.g. by accessing a conversation database using the user ID and/or local storage of recent conversations. The conversation database can be distributed and span multiple services, including social networks (personal, professional, business, private, public, protected, etc.).

At step 210, the system generates a suggestion for continuing at least one conversation. The suggestion can be made based on the last live conversation (default), user location, preferences, device context (other applications open), communications security channels available, transaction value, priority, and other factors.

At step 215, the system decides whether the suggested conversations satisfy the user. If yes, the system proceeds to step 220 where the user selects a conversation.

Otherwise, the system enables the user to search for a conversation at step 240. The user can search for a conversation using conversation topics, parties involved, location information, transaction value, priority, and other factors.

In another implementation, the user is enabled to browse a directory and pick a relevant conversation party.

In a yet another implementation, the system provides a combination of search and directory access mechanisms. For example, when a search for a specific French restaurant doesn't produce any matches, the user is presented with a directory of highly rated French restaurants listed in the system. The ratings of the restaurant can be derived from various factors, e.g. an average of star ratings from external review services such as Zagat; from users who have no relationship to the searcher; from the searcher's social network, the system's internal ratings based on previous conversations between the restaurant team and other users, or a combination of such ratings mechanisms.

If a conversation is found, the user goes to step 220 to select a conversation. Otherwise, the system notes that no conversation has been selected and proceeds to step 125 described on FIG. 1.

When user selects a conversation at step 220, the system identifies the conversation and sets the mode to Selected=True, and then transitions to step 125 described on FIG. 1.

Figure 3:
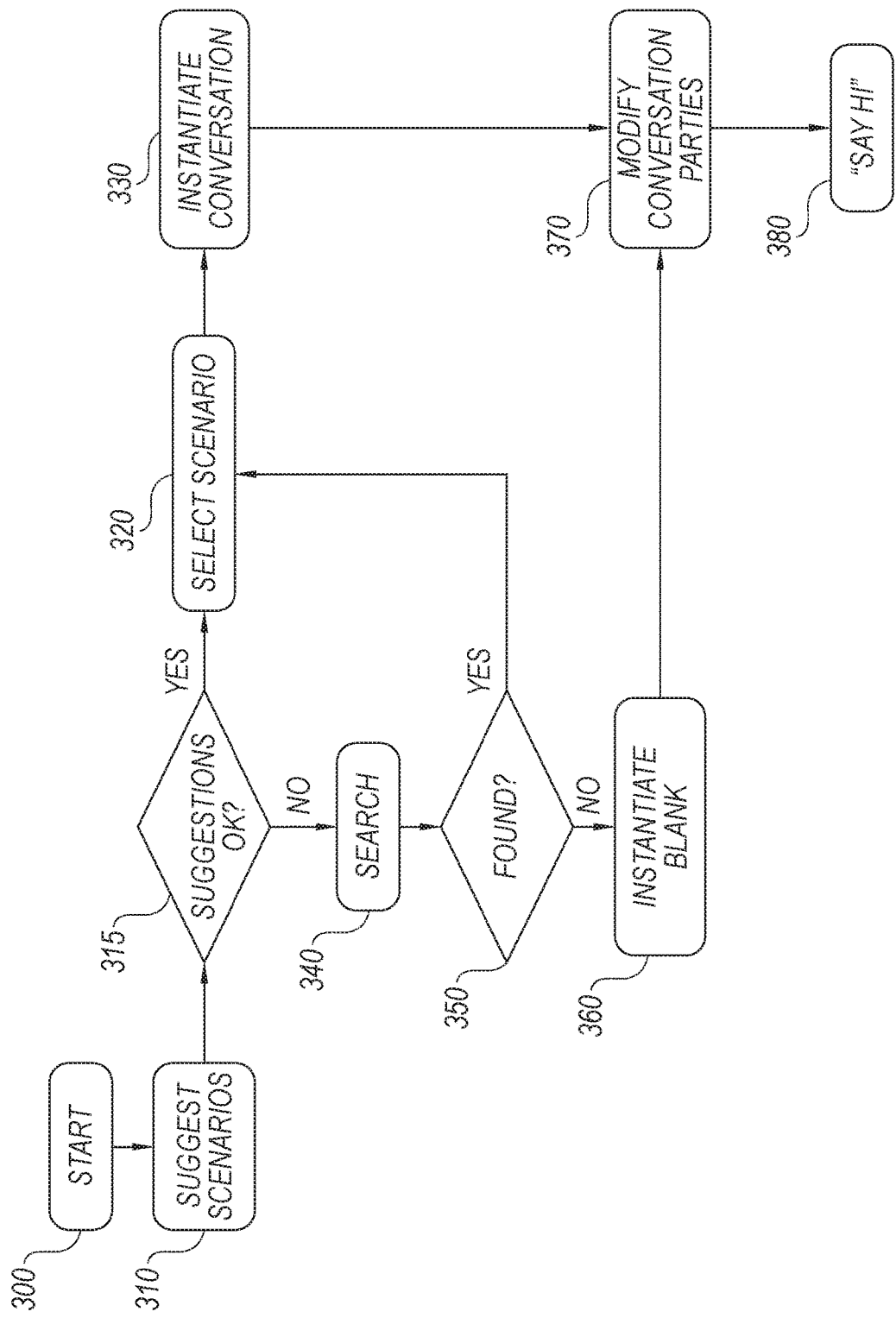
FIG. 3 is a block diagram of a process for conversation creation.

FIG. 3 is a block diagram of a process for conversation creation.

The system starts at step 300 by initializing potential conversation parties, communication channels, and scenarios.

At step 310 the system suggests a number of typical pre-defined scenarios, e.g. Medical Emergency, Security Alert, Automobile Insurance Claim, Airport Arrival, New on the Job, New to the Neighborhood, Ordering Food. Entertainment, etc. A particular service provider, e.g. listed in the directory, can present their own scenarios related to the services typically offered to customers. Default scenarios may differ based on the user's location, e.g. determined by GPS functionality. For example, when the user is located in the store, she may be presented with a "May I help you" scenario.

In one implementation, to directly invoke a predefined scenario, the user presses a dedicated hardware or software button, or by making an utterance, or by performing a pre-defined gesture such as moving their hand or eyes in a certain pattern. E.g. in case of danger, the user invokes a "911" scenario with a panic button where police would be at least one pre-defined party.

In another implementation, the system invokes a medical emergency scenario the user's vital signs are communicated to the device from other connected devices, such as heart monitor, blood pressure monitor, etc.

In a yet another implementation, the system invokes an Auto-insurance Claim scenario when the user's automobile sends a signal of an accident, e.g. when the airbag is deployed, or the automobile's security system is triggered, or the glass is broken, etc.

In a yet another implementation, a third party invokes a conversation scenario. For example, in a "Health Check," a medical nurse contacts the user remotely to acquire vital signs for a periodic checkup. Similarly, a parent invokes an "Everything's Ok?" scenario when the child is not home at a pre-defined time. In all cases, the third party can be a human individual, an animal, an artificial pre-programmed agent or a combination of the above.

At step 315, the system decides whether the proposed scenarios are suitable to the situation. In one implementation, the user makes the decision. In another implementation, the conversation takes place in the background between artificial agents, e.g. medical devices that determine whether measured vital signs warrant human intervention. In a yet another implementation, the police determine the level of danger based on data from surrounding people and/or security cameras.

If the suggested scenario(s) is ok, the system proceeds to step 320 where it selects the scenario. Otherwise, the system enables a search for a suitable scenario (step 340).

If the scenario is found (step 350), the system proceeds to step 320 (Select Scenario). Otherwise, the system goes to step 360 and instantiates a blank conversation.

At step 330, the system instantiates a conversation according to the scenario selected at step 320. A detailed description of step 330 is provided below.

At step 370, the system modifies conversation parties. In one implementation (e.g. an auto accident scenario), the user chooses to replace the name of his/her insurance agent. In another implementation, the user chooses to add his/her spouse. In a yet another implementation, the user chooses to add his/her favorite car repair shop. In one more implementation, the user chooses to replace a specific person with a business.

At step 380, the system either generates default messages (conversation starters) to all conversation parties, or enables the user to create the messages, or a combination of both. A detailed description of step 380 is provided below.

Figure 4:
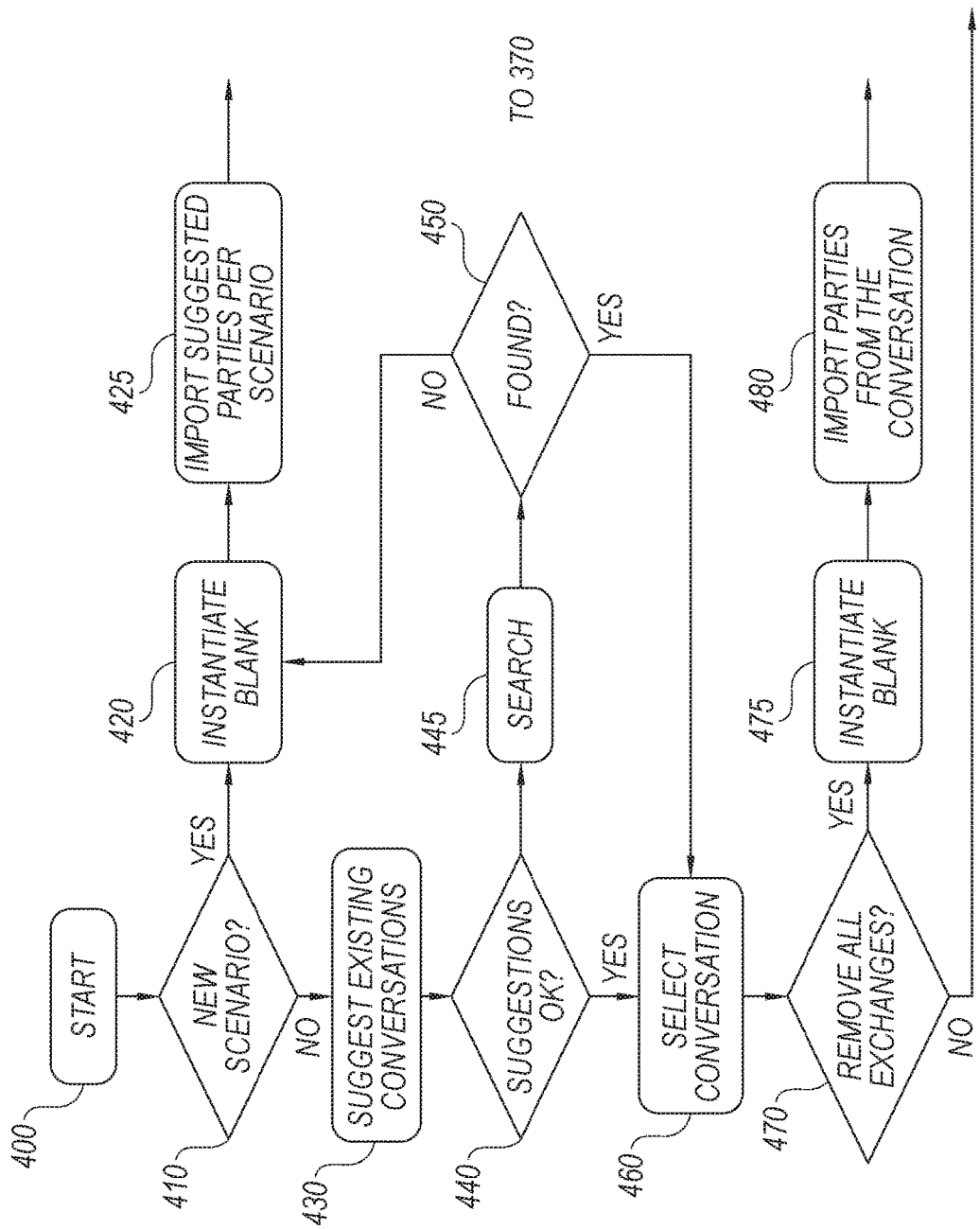
FIG. 4 is a block diagram of a process for instantiating a conversation from a scenario.

FIG. 4 is a block diagram of a process for instantiating a conversation from a scenario. The system can run it separately or as step 330 in FIG. 3.

The purpose of the process is to allow the user to create a conversation either from a previous similar conversation of the same scenario, or use a blank scenario prototype.

At step 400, the system initiates a look up of a scenario-based conversation that can be used as a sample for a new conversation. At step 410, it decides whether it is a new scenario for the user or his/her team or his/her business. The scope of scenario novelty depends on at least one of the following: user preferences, conversation experience, team and/or business affiliation, whether the user is human or artificial, services involved, location, timing, etc. The system may also apply a security, confidentiality, and/or privacy filter to exclude unauthorized access to data from previous conversations.

In one implementation, a business uses a standard scenario for all conversations of a certain scenario type. For example, for a new employee orientation message exchange a standard scenario includes mandatory roles of a Human Resources Manager, Department Manager, IT specialist, and Security specialist.

In another implementation, potential previous conversations for a given scenario include only conversations of the user's team members. For example, an insurance agent uses by default contacts from a previous conversation of his department staff that interacted with the same customer.

In a yet another implementation, the user starts a conversation with his doctor's nurse. The conversation by default adds contacts of his spouse, doctor, and pharmacy.

In a yet another implementation, customer support conversations available to the user as prototypes only include those that were marked as highly satisfactory.

If at least one previous conversation with the same scenario is found, the system suggests at least one existing conversation at step 430. After that, at step 440 the system decides whether the suggestions are ok, e.g. with user preferences or the composition of the parties, and selects a prototype conversation at step 460.

At step 470, the system decides whether to remove all previous message exchanges from the conversation or not. The decision depends, e.g. on privacy, security, confidentiality, relevancy, and other conditions.

In one implementation, the decision is made automatically because the conversation involves financial transactions and user identifying information that the system is not set up to share in an insecure connection environment.

In another implementation, the decision is left to the user who can press, e.g. a Clear button, to remove all conversation elements except the parties involved in the conversation. For example, in an auto insurance claim scenario, all previous information specific to the accident is removed because it involved a different set of circumstances.

In a yet another implementation, the system delegates the decision to a team supervisor (or some other third party) who is not going to be a part of the conversation, unless it is escalated.

If the decision is to remove all exchanges, the system instantiates a blank conversation at step 475, registers it with the system, and import participants from the prototype conversation. If not, the system proceeds further, e.g. to step 370 from FIG. 3 to allow the user to modify participants, both their roles and specific individuals.

If at step 410, the system decides that the scenario is new, it instantiates a blank conversation at step 420, registers it with the system, and imports suggested party roles according to the scenario, without instantiating the actual individuals. That is, the user and/or his/her team are supposed to fill in specific individual contact info to start the conversation.

For example, in an Auto Accident scenario, the system creates a prototype conversation with roles of Insurance Agent, Police, My Lawyer, Witness 1, Monitoring Service (an artificial agent that records all communications in a conversation), Repair Shop, Medical Service, The Other Party, and The Other Insurance Agent. The user is supposed to fill in specific names on the next step (see FIG. 3 description).

If at step 440, suggested conversation is not approved, the user is enabled to perform a search within the scope of previous conversations (step 445).

In one implementation the system performs search over all user conversations.

In another implementation the system performs search over conversations in the same city.

In a yet another implementation the system performs search over conversation within a given time interval in the past, e.g. last year.

In one more implementation, the system performs search over conversations with people within the same demographic range with the user.

In yet another implementation, the system performs search over conversations rated above a certain user satisfaction threshold.

In one more implementation, the system performs search over conversations with people who belong to the person's social or business network.

If a desired conversation is found (step 450), the system proceeds to step 460. Otherwise, it goes to step 420.

Figure 5:
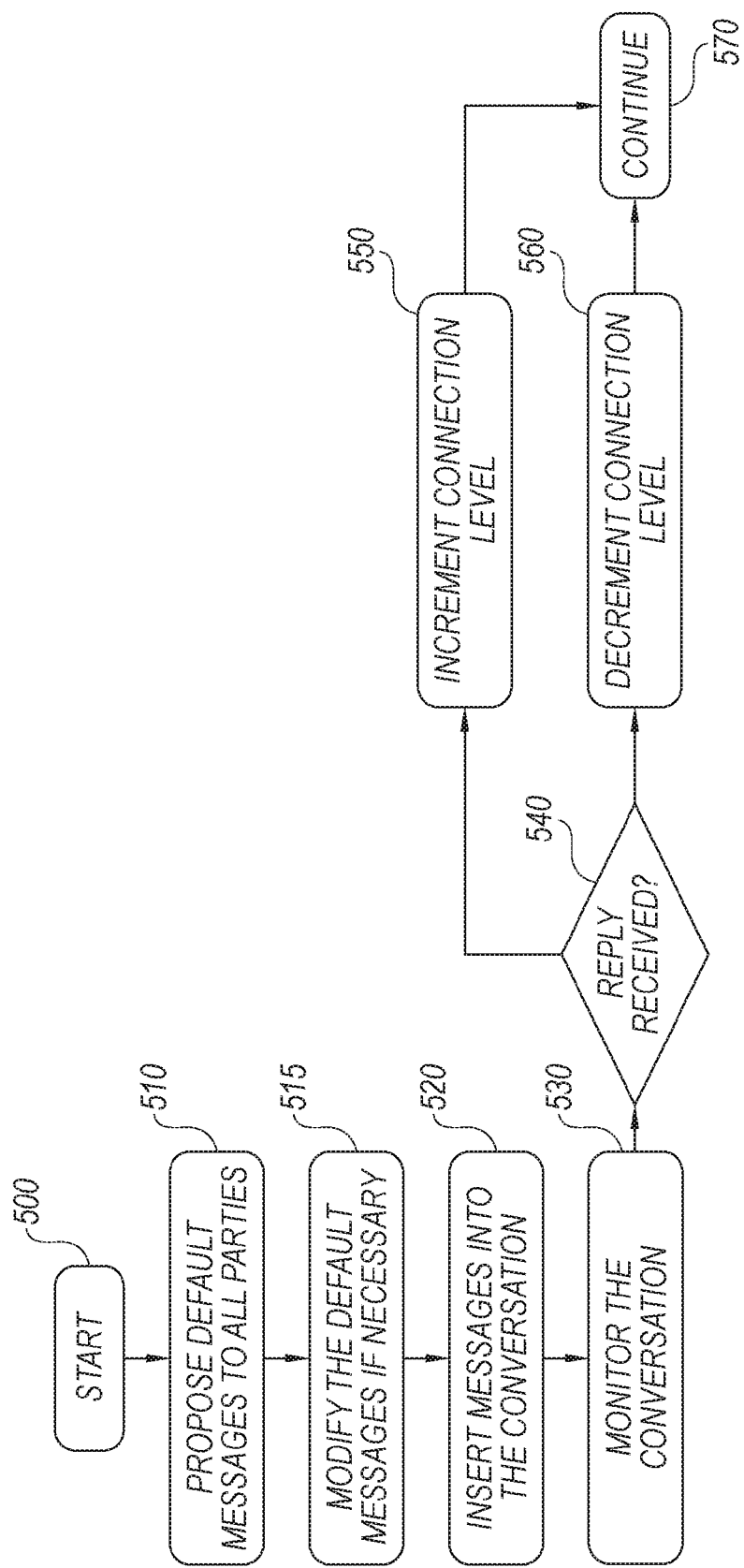
FIG. 5 is a block diagram of an initial interaction within a conversation ("Say hi")

FIG. 5 is a block diagram of the initial interaction within a conversation ("Say hi"). The purpose of the process is to introduce participants to each other and to establish the level of connection between them, At step 500, the system creates an instance of the conversation with potential parties and roles involved. For example, when the user opens the application for the first time, the system creates a conversation and populates it with businesses and/or community organizations that are preferred by local residents.

In another example, when a new employee joins the company, the system populates his "Say hi" conversation with an HR rep and his team members.

In a yet another example, after being acquainted with his team, the new employee is prompted to "Say hi" to the customers that his predecessor on the job interacted with most productively.

In one more example, an automatic "Say hi" message is customized, depending on the former relationship between the parties, including characteristics of the target group and/or team.

At step 510, the system proposes default greeting messages to be sent within the conversation. In one implementation, the message includes at least one of: name, address, email information, phone number, working hours, etc.

In another implementation, the message includes a brief greeting in the user's language (Hi, I'm John.)

In a yet another implementation, the message includes a personal introduction from a friend who referred the user to the service.

In one more implementation, the message includes a request for information, e.g. "What are your working hours?" "What's my budget for the month?" etc.

At step 515 the user is enabled to modify the default messages, e.g. to personalize the greeting.

At step 520, the system inserts messages into a conversation and sends them to all parties involved.

At step 530, the system monitors the interaction between parties over a period of time, while the user is within a certain location, or until a certain condition is met.

At step 540, the system checks whether a reply has been received from at least one of the conversation parties. If yes, the system increments the connection level between the parties involved (step 550). Otherwise, the system decrements the connection level (step 560), or leaves it unchanged.

The connection level can be used to determine the strength of the connection between the user and other parties. For example, the next time the user searches for a business service of a certain time, only businesses with a certain connection level are included in the search. The system may also take into account whether a human or automated reply has been received.

In one implementation, the user is enabled to request only human conversation parties for a given scenario.

The "Say Hi" process can be used for any introduction to a new situation, such as service registration, scenario initiation, arrival at a location (airport), online greetings, first walk-through on a new device to get acquainted with available device features, receptionist services, and etc.

In one implementation, the process is executed in a newcomer mode, where the user is completely unfamiliar with the potential conversation parties and needs to learn everything from scratch.

For example, when one arrives at Paris (CDG) airport for the first time, his "Say hi" application proposes conversations with the airport information service, a highly rated airport sports bar, a money exchange service, and his airline's connection service.

In one scenario, ratings are derived from reviews and evaluations from the members of the general public derived from 3rd parties, e.g. Yelp, Amazon, etc. The system also enables to use ratings based on feedback from one's social network connections, e.g. Facebook friends (or friends of friends), LinkedIn colleagues, followed Twitter feeds, etc. In another scenario, ratings are derived from reviews and evaluations from the system's users only. Such ratings are preferred because they contain information about outcomes of the conversation, such as a sale, a thank you message, a complaint, etc.

In another implementation, the process is executed in the "local" mode, where the user assumes an identity of a local person, highly experienced in the surroundings.

For example, when one moves a new neighborhood in San Francisco, the system proposes to him to "Say hi" to businesses frequented by people with similar preferences and/or demographic characteristics. For that purpose, the system may initiate a Q&A session with the user prior to the arrival. Alternatively, the may make inferences from the user's history of transactions and create a model profile to be used in the future.

In a yet another implementation, the process is executed in the "human" mode, where the user desires to talk to humans only. In that case, the system contacts businesses and/or team members who are available in real time.

Figure 6:
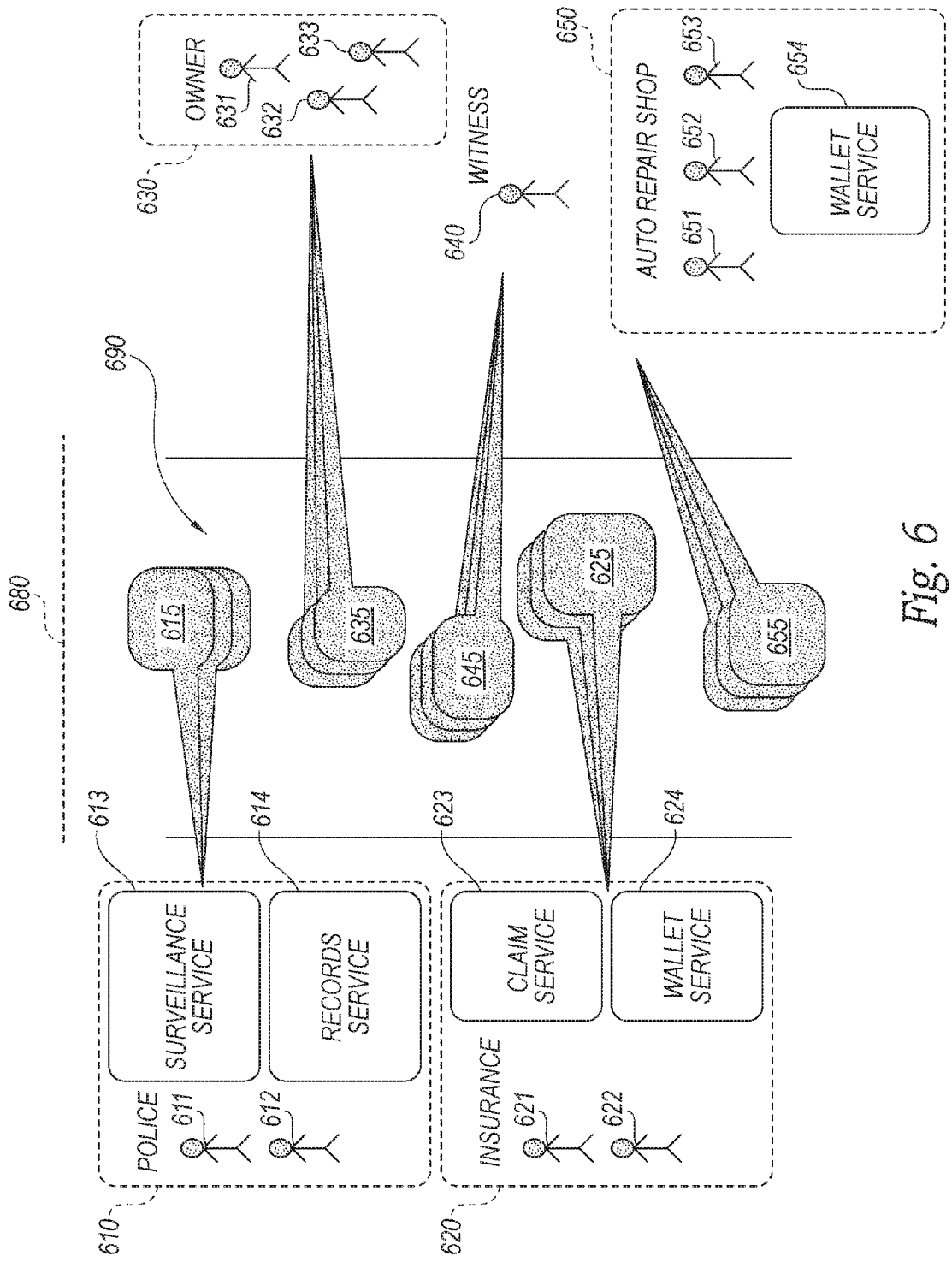
FIG. 6 illustrates an auto insurance claim user scenario enabled by the system of the disclosed technology.

FIG. 6 illustrates an auto insurance claim user scenario enabled by the system. According to the scenario, Bob is a car owner 631. An unknown person broke the car's side window and stole Bob's laptop. Since Bob's car is insured, he wants to submit an insurance claim, recover some of the damages, and fix the car. The claim process involves multiple parties, e.g. Police 610, Insurance Company 620, Bob's wife 633 and lawyer 633, Witness 640, and Auto repair shop 650.

The insurance claim process involves coordination between multiple parties to arrange for several major steps that include, but are not limited to submission of evidence, furnishing a police report, filing a claim, towing the car, providing an estimate for repairs, and repairing the car.

In case of emergency, the conversation can be escalated to all participants, or a specific team, or a specific member within the team.

To facilitate the transaction Bob uses an implementation of the system of the disclosed technology and creates conversation stream 680.

In one implementation, Bob creates a new conversation manually and adds all the parties himself.

In another implementation, Bob uses a default Auto Insurance Claim Scenario provided by the system or his Insurance Agent 621, and adds relevant parties.

In a yet another implementation, Bob contacts his Insurance Agent 621, via telephone (not shown), who creates the conversation as a standard means to process customer claims and adds Bob to the conversation.

In one more implementation, Police Officer 611 creates the conversation when Witness 640 reports the burglary.

Participants of the conversation are organized as teams. All messages and digital communications (conversation fragments), e.g. pictures of the car, repair estimate document, and others, become a part of the conversation stream accessible to all team parties. Conversation participants may or may not know each other personally. In the present example, Bob knows personally Insurance Agent and Auto Repair Mechanic 651 from previous interactions. Conversations fragments can be sent to individuals as well as teams.

In some implementations, all fragments are available to all internal team members. In other implementations conversation fragments are distributed according to pre-defined rules. In a yet another implementation conversation fragments are distributed according to predefined rules arranged according to team structure (team graph). Team graph can be implemented as flat, hierarchical, distributed, etc.

In one more implementation, certain conversation fragments e.g. value tokens, are distributed over secure channels only.

All fragments are given at least a time stamp and/or a hash value and associated with the conversation ID.

Conversation participants see and enter fragments on their devices in a conversation stream 690.

Bob's team 630 comprises himself 631, his wife 632, and his lawyer 633. The team may use the system separately as a private means to discuss the accident among themselves concurrently with conversation 680.

Police team 610 comprises Police Officer 611, Records Clerk 612, Surveillance Service 613, and Records Service 614. Surveillance and Records Services are computer implemented systems (artificial individuals) enabled to receive, process, and send conversation fragments.

For example, Surveillance Service can be implemented as a digital media database with a conversation interface responsive to structured and/or free-form queries. In another example, Surveillance Service is implemented as a digital/photo video camera system with storage. It can be a fixed and/or a portable camera, or a combination of multiple cameras attached to a building, person, car, helicopter, drone, etc.

In one more example, Surveillance Service can be implemented as a text-based system containing reports from private and public sources. In one implementation, a system of the disclosed technology can be used as a Surveillance Service gathering inputs (fragments) from multiple observers (human, animal, artificial).

Records Service provides police reports necessary for processing insurance claims. It can be implemented as a digital document repository with an interface responsive to conversation fragments. For example, it can provide detailed police report data based, e.g., on report ID, accident location information, car ID, owner, suspect, police officer, and a combination of such multiple identifiers.

Insurance team 620 comprises Insurance Agent 621, Claim Adjustor 622, Claim Service 623, and Wallet Service 624. Wallet Service 624 is a computer-implemented system enabled to process payments, e.g. receive instructions, send and receive value tokens, using the conversation interface. Value tokens can represent currency, coupons, credits, game currency, bitcoins, affiliation card points, etc. The service can be implemented as a third party financial transaction system, e.g. digital wallet, credit card processing service; or as a value transfer subsystem to the conversation system; or a combination of both.

Similarly, a third party application can use the interface to communicate to the services and consumers. The system is enabled to charge commissions, e.g. as a percentage and/or fixed and/or variable fee, for accessing the interface and/or concluding transactions.

In an internal implementation case, Wallet Service keeps track of considerations users provide in return or advance for products and services, Users are enabled to buy internal credits using official government currencies or other means of payment, e.g. loyalty points, BitCoins, etc.

Auto Repair shop team comprises Mechanic 651, Shop Owner 652, Receptionist 653, and Wallet Service 654.

During the process of Conversation 680, parties exchange multiple conversation fragments 615, 625, 635, 645, and 655, pertaining to the transaction. Communications and user interface components of the system, e.g. mobile apps, place the fragments into Conversation Stream 690 available to conversation parties on their respective conversation devices, such as smartphones, tablets, digital watches, digital glasses, television screens, computer monitors, electronic readers, brain-computer interfaces, equipment control panels, etc.

In one example of the Auto Insurance Claim scenario (FIG. 6), car owner 631 finds his car burglarized. The burglar flees the scene, but Witness 640 agrees to confirm the fact of the crime. Owner 631 starts a conversation application on his mobile device and locates Auto Insurance Claim Scenario (see FIG. 3 description above). Using the "Say Hi" logic, the app proposes to start a conversation with key parties: Police, Insurance, Owner, Witness, and Auto Repair Shop, Owner 631 asks Witness 640 for some personal information and locates him within the system. The system invites Witness to join the conversation. Since Witness 640 is a registered user, Owner 631 doesn't have to provide detailed personal information to the owner. He also doesn't need to provide his account of the accident, unless requested later.

Witness 640 leaves the scene. Owner 631 uses a step-by-step "Say Hi" process to send customized messages to all parties required to create and process an auto insurance claim. Since the system has Police department registered within the service, it locates ID for the Police Officer 611 responsible for the dealing with the claims. Owner 631 notifies Police Officer by typing his message (a conversation fragment) and inserting pictures (conversation fragments) of his burglarized car into Conversation 680. The system is configured to send the conversation fragments to the police officer as well as the entire Police team 610.

Police Records clerk 612 becomes a party to the conversation as a member of the police team. He adds Records Service to the conversation and requests a police report number, which is entered into the conversation.

Since car burglary is not a violent crime, the police officer is not required to attend the scene in person. He adds Surveillance Service 613 to the conversation and queries it for street snapshots within the time interval of the crime. After matching time and location of the accident, Surveillance Service 613 discovers several videos from street cameras that capture the moment of the crime and extract snapshots from them. The service adds the snapshots (conversation fragments) to Conversation 680.

In the meantime, the system adds Insurance team to Conversation 680. Using an interactive process, it asks the user for his policy number, and other identifying information. Using the information the system locates registered Insurance Agent 621 responsible for processing claims and adds him to the conversation. By the virtue of being added to the conversation, the agent is notified of the accident. He also receives information provided by the user, police, and witness.

The system asks the agent to fill in the default roles of Claim Adjustor 622, Claim Service 623, and Wallet Service 624. Having located registered persons (human and artificial) within the system, the agent adds them to the conversation.

Claim Service 623 interacts with Owner 631 to gather information about the accident and verify coverage information. Because it knows that Police team 610 and Witness 640 are parties to Conversation 680, it requests and receives information from them within the same conversation. Information exchanges may occur in real time and/or asynchronously, depending on availability of persons involved.

Once the information necessary for submitting an insurance claim is ready, Claim Service 623 notifies Claim Adjustor 622, so that she begins claim valuation process.

In the meantime, Owner 631 adds his Wife 632 and his Lawyer 633 to the conversation. He instructs the system that his wife is an active participant, while his lawyer is a passive participant. As the result, Wife 632 receives all conversation fragments by default, while Lawyer 633 will receive them only when Owner 631 instructs the system to share Conversation 680 (or any of its fragments) explicitly.

Because the owner has an important meeting, he asks his wife to contact a repair shop. Wife 632 knows Mechanic 651. She finds him within the system and adds him to the conversation. Prompted by the system, she designates the repair shop where he is employed as Auto Repair Shop team 650.

The system contacts the shop. Since Mechanic 651 is not available for messages, Receptionist 653 interacts with the system to respond to the invitation to join the conversation. She also adds Shop Owner 652, who instructs his staff to tow the car and gives them location information contained in the conversation.

Once the car is delivered to the shop, Shop Owner 652 creates a detailed estimate for repairs and adds it to the conversation, directing it at Adjustor 622, Owner 631.

When the adjustor doesn't reply within a day, Wife 632 uses the conversation to alert Insurance Agent 621 to the delay. As the result, Adjustor 622 contacts Receptionist 653 to schedule a visit to the shop to verify the estimate.

Once the visit is complete and estimate verified, Adjustor validates the estimate using Conversation 680. The system notifies Insurance Agent 621 and Claims Service 623. Insurance Agent completes the claim process by instructing Wallet Service 624 to transfer money to Wallet Service 654 that belongs to the auto repair shop. In one implementation he sends the instructions as a text fragment in the body of the conversation. In another implementation he drags and drops the amount due on the claim from an icon representing his Wallet Service to an icon representing the shop's Wallet Service. The icons are located on his portable device and displayed next to Conversation Stream 690.

Car Owner 631 monitors the transactions using the conversation system. He asks Shop Owner 653 to instruct Mechanic 651 to fix the car. When the car is ready, Mechanic 651 takes its pictures, adds them to the conversation, and notifies the owner. Owner 631 arranges with Receptionist 653 to pick up the car.

As the result of the process, all parties have access to copies of all documents and transactions. Instead of using various means of communications, such as e-mail, phone, web, personal interactions, they rely on the conversation system to provide an efficient medium for gathering information for the claim, processing the claim, transferring funds, and making sure that the car is fixed.

To make the system even more efficient, the system is enabled to use reminder, calendar, auditing and other automated services. The services are configured to generate reminders if conversation parties are not responsive to certain conversation fragments. That is, internal exchanges within a conversation can be timed, so that automatic reminders are sent.

For example, when Owner 631 sends a message to Insurance Agent 621, he attaches a conditional reminder service timer that generates a repeat if Agent 621 doesn't reply within 24 hrs.

In another example, an automated auditing service asks Owner 631 for feedback on the entire transaction and its parties. The owner rates various aspects of the transaction. The service is enabled to evaluate objective information, such as claim processing or auto repair duration, and combine it with subjective feedback supplied by the user. As a result, the system is enabled to compare performance of different parties within the same set of scenarios. It can use the information to suggest a higher rated team (car repair shop, insurance adjustor, etc.) during the initial stages of a particular scenario. The system is also enabled to provide information to employers of each team to rate their performance for internal purposes, e.g. promotions, pay raises, recommendations, etc.

Figure 7:
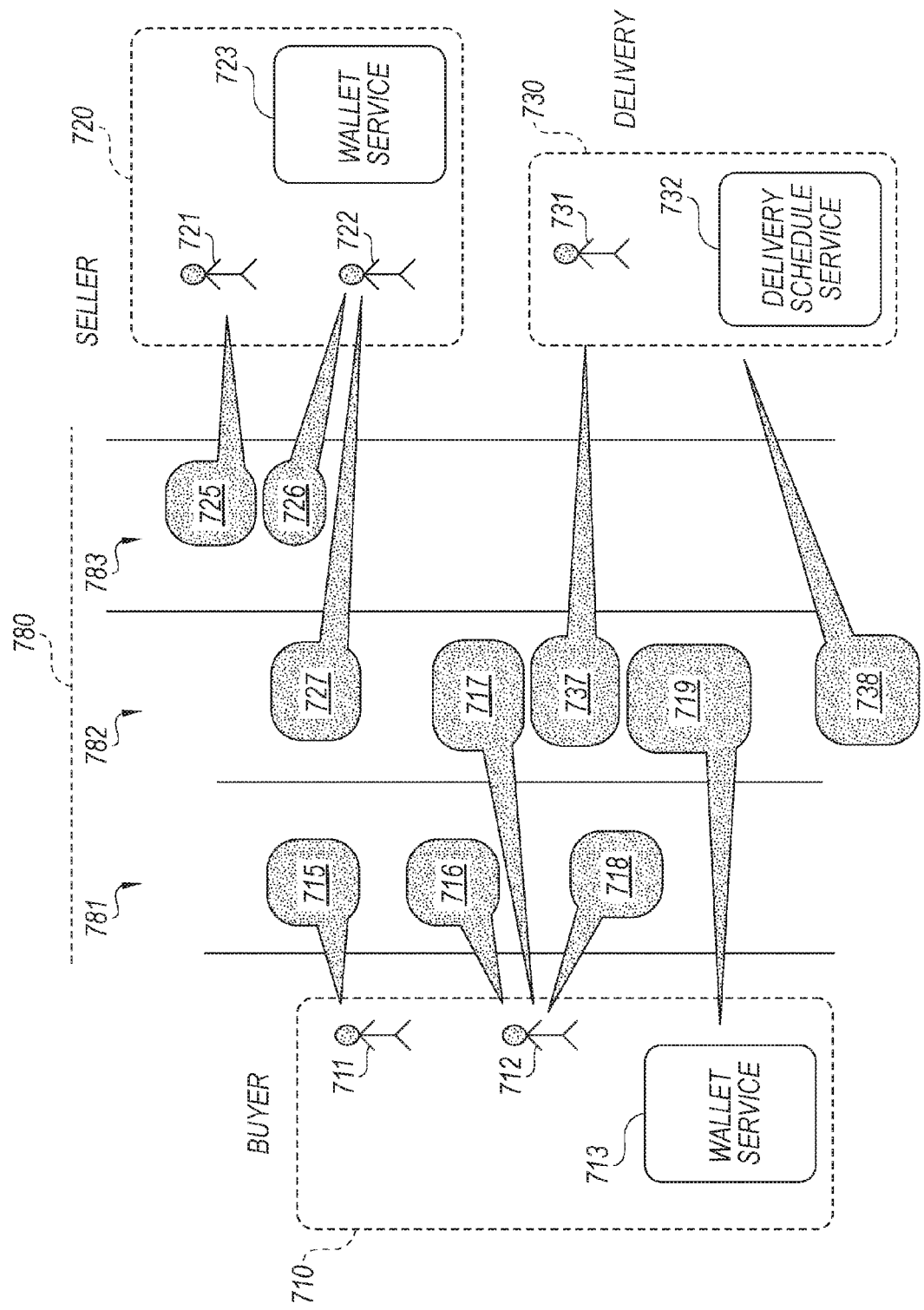
FIG. 7 illustrates a product purchase and delivery scenario enabled by the system of the disclosed technology.

FIG. 7 illustrates a product purchase and deliver scenario user scenario enabled by the system of the disclosed technology.

The scenario involves three teams, Buyer 710, Seller 720, and Delivery 730. The teams interact using Conversation 780.

Buyer team 710 comprises human Buyer agents 711, 712, and automated Wallet Service 713.

Seller team 720 comprises human Seller agents 721, 722, and automated Wallet Service 723.

Conversation is configured to have multiple sub-conversations, 781, 782, and 783. Buyer team uses sub-conversation 781 to exchange confidential messages; Seller team uses sub-conversation 783 for their own confidential messages: all teams use sub-conversation 782 for joint messages (conversation fragments).

Delivery team 730 comprises human Delivery agent 731 and automated Deliver Schedule Service 732.

In one example, the seller team specializes in customized kitchen cabinets. Seller agents are physically located at different locations: agent 721 is at the store, agent 722 at the manufacturing site. Agent 721 creates open Conversation 780 that indicates to prospective buyers that the store is open for business. Agent 721 registers the conversation with the system of the disclosed technology. After exchanging private messages 725 and 726, agent 722 places an invitation to make an offer in the public domain of the system via sub-conversation 782.

The buyer team discovers the offer by searching the system for kitchen cabinets. Initially, Buyer agent 711 uses her mobile phone to browse available deals. When she locates a suitable offer, she makes agent 712 a member of her team and, after exchanging with him messages 715 and 716, she transfers the conversation to the large screen digital TV in their living room. Both teams exchange messages (not shown) that include pricing, technical, graphical, video, and other information to negotiate the offer. All messages are a part of the same Conversation 780, but split into different sub-conversations to avoid confusion among the parties and allow for private discussions of various aspects of the offer.

Finally, agent 712 makes an acceptable offer 718. He adds their Wallet Service 713 to the conversation. Seller Team accepts the offer (not shown) and adds Delivery Team 730 to Conversation 780, allowing it to interact only through the public sub-conversation 782.

Delivery Agent 731 suggests (737) a possible delivery schedule, which agent 712 accepts. After that, Wallet Service 713 is instructed to transfer money (719) to Wallet Service 723.

Automated Deliver Schedule Service 732 finalizes the schedule using sub-conversation 782. Since all parties are enabled to monitor the sub-conversations they participate in the process ensuring that the service has information what product packages, when, how, at which price, at what time, at which location, with what notification options, are going to be delivered to the buyers. If necessary, sellers 721 and 722 participate in the conversation to complete the transaction.

The system enables Seller team 720 to create a separate private sub-conversation with its subcontractors to negotiate various aspects of the transaction. In one example, they use the sub-conversation to discuss technical aspects. In another example, they use the sub-conversation to distribute money among the participants. In a yet another example, they use the sub-conversation to discuss customer complaints when scheduled delivery doesn't take place on time or has other discrepancies from the original agreement.

In some implementations, the system enables Buyer team 710 to divide money between the parties in the public sub-conversation 732. For example, they are enabled to allocate tips per team member or between different sub-contractors, depending on the level of service provided.

The system enables efficient transactions because it covers end-to-end conversations associated with the order. All teams are enabled to review the conversation at a later time.

For example, the supervisor of the seller team 720 may evaluate negotiation tactics used by the team. In another example, the supervisor may request and receive aggregated parameters from multiple buyer teams to see how much conversation time and effort it takes to negotiate a transaction with a particular seller team. That is, since all sub-conversations belong to the same conversation, the system enables statistical analysis of transactions across multiple buyers, sellers, and their sub-contractors. The supervisor may use the information to create a high-level control dashboard to monitor transactions using interactive graphical interfaces across different teams, locations, types of products, etc. The supervisor is also enabled to add team members and/or incentives if she concludes that the conversation is not proceeding well.

The conversation records can be used for customer support, dispute resolution, product returns, re-negotiations, repeat purchases, incentive offers, training sessions, etc.

User interfaces in the system are enabled to browse (e.g. using scroll interface on a multi-touch display with a "swipe" gesture) each sub-conversation synchronously or separately. For example, when agent 711 wants to review her private conversations with agent 712, she can independently go back over sub-conversation 781 without affecting the representation of sub-conversation 782, either on her own device or on everybody else's device. In one implementation, to enable a broader view of the conversation, the interface displays multiple threads and scrolling options when the user turns it, e.g. from portrait to landscape mode.

Figure 8:
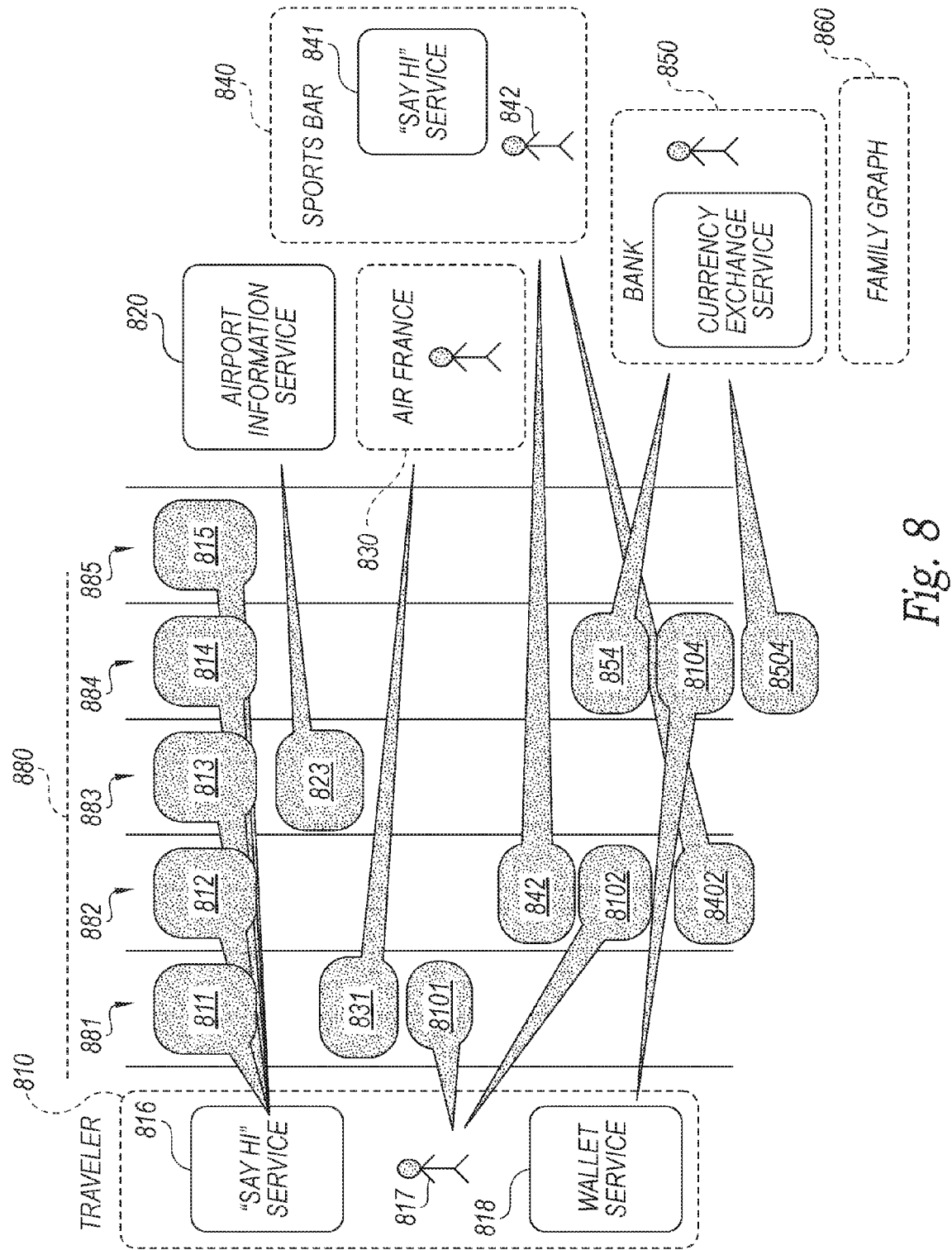
FIG. 8 illustrates an airport arrival user scenario enabled by the system of the disclosed technology.

FIG. 8 illustrates an airport arrival user scenario enabled by the system of the disclosed technology.

According to the scenario, traveler 817 flies for the first time from San Francisco airport (SFO) to Paris Charles De Gaulle airport (CDG). Upon arrival, the traveler starts his mobile application that serves as an interface to the conversation system. He activates the Say Hi scenario for the airport, by hitting "Say Hi" soft button on the device. The system creates a new composite conversation 880, comprising 5 independent sub-conversations (881 through 885).

By default, the system creates a team 810 for the traveler, adding instances of "Say hi" 816 and Wallet 818 services. In one implementation, the system detects popular businesses at the location. In another implementation, the system is pre-configured with certain business instances by the user before the flight. In a yet another implementation, the system adds teams in an interactive mode, asking the traveler whether he wants to connect.

Say Hi Service 816 generates default messages (811 through 815) directed at the selected teams.

First, Airport Information Service 820 replies with a welcome message 823 containing an airport map, border and customs notes, and locations of restrooms, restaurants and major duty-free stores. If desired, the user can initiate a conversation (Say Hi) with any of the restaurants or stores. In one implementation, the message is customized with the traveler's language, age, gender, other explicitly or implicitly expressed general preferences. In another implementation, the system communicates to service 820 the traveler's system ID, which the service uses to obtain his travel preferences from a remote database. In a yet another implementation, the traveler picks specific questions from a menu suggested by his Say Hi service 816. In one more implementation, a third party (not shown) guides the user in selecting, asking, and replying to messages from Airport Info Service 820. This interactive mode is implemented using either sub-conversation 816 or a different sub-conversation. Service 820 is enabled to offer incentives, such as coupons and discounts, which can be transferred between different sub-conversations, e.g. by dragging and dropping them on the application user interface. The system is enabled to analyze effectiveness of incentives, provide feedback to the service providers, and adjust them to improve effectiveness.

Second, an Air France customer service representative 830 replies with message 831 placed into sub-conversation

881. In this scenario, the traveler's initial message 811 contained his frequent flyer information; therefore, message 831 contains connecting gate and time data. The traveler is enabled to interact with the service and he replies with question 8101. Other message exchanges may take place within the sub-conversation (not shown). In one implementation, Say Hi service sends traveler's system ID, which allows representative 830 to locate the traveler's frequent flyer information and other personal data allowed to be shared in this scenario. The representative is enabled to customize her messages, similar to the customization options described earlier.

The user is enabled to authorize or de-authorize a specific person and/or team to access personal information. The authorization can be applied at different levels: team, relationship, conversation, and/or conversation fragment.

The user is also enabled to review his/her authorizations.

Third, an automated message 842 from "Say Hi" service 841 arrives. It contains default information about Sports Bar team 840; the information includes location, menu, and popular game schedule for the next two hours. Service 841 is a 24×7 part of the Sports Bar team. It is configured to reply to standard "Say Hi" requests in languages preferred by the travelers. Most travelers contact the bar using their conversation app rather than the more traditional web interface.

Traveler 811 replies with message 8102, asking to reserve a spot in front of the big TV in 30 minutes. Since the automated service 841 can't understand the message, it is routed to waiter 842, who replies with message 8402, confirming the reservation, Fourth, a reply message 854 from Bank team 850 arrives to sub-conversation 884. The message contains foreign exchange information. The traveler uses his Wallet Service 818 to exchange money certificate 8104. The Bank's Currency Exchange Service replies with message 8504 confirming the exchange. The message represents a receipt that can be moved to the traveler's expense report conversation (not shown) started when his manager authorized the trip. The user interface of the application supports drag-and-drop, hold-and-search (e.g. using a pop-up menu), and other types of interactions for conversation navigation.

As discussed in FIG. 5 description, the system is enabled to increment successful interaction counts, so that the next time the traveler arrives to the airport his conversations are automatically connected to preferred teams/individuals/services.

In some implementations, the system keeps track of user interactions and suggests teams/individuals/services with high connection levels across users of a certain demographic group or other type of group or personal preferences.

No reply comes from Family Graph team 860. The team represents a segment of the traveler's extended family that lives in Paris. The system forms the team based on the traveler's information submitted in his preferences, imported through social networks, email, and other mechanisms. Unfortunately for the traveler, nobody among his distant relatives is online. Since he doesn't know them personally, or is not aware of their plans, message 815 is sent to the entire virtual team.

In other scenarios, the traveler is enabled to browse Family Graph before the flight and identify individuals that he would like to contact upon arrival. Based on his preferences, message 815 can be sent to specific selected individuals, or the entire graph. Similarly, the traveler can send a Say Hi message to his social or business graph or a combination of any members of both.

As discussed above, user interface allows the traveler to interact with each sub-conversation independently. Also, he has an option of joining or splitting sub-conversations. For example, he joins sub-conversations 881 and 881 to discuss with the airline and bar waiter whether he has enough time to for a glass of wine before the connecting flight.

The traveler is also enabled to transfer money from his Wallet Service 818 to the Sports Bar team 840 via Bank 850.

Figure 9:
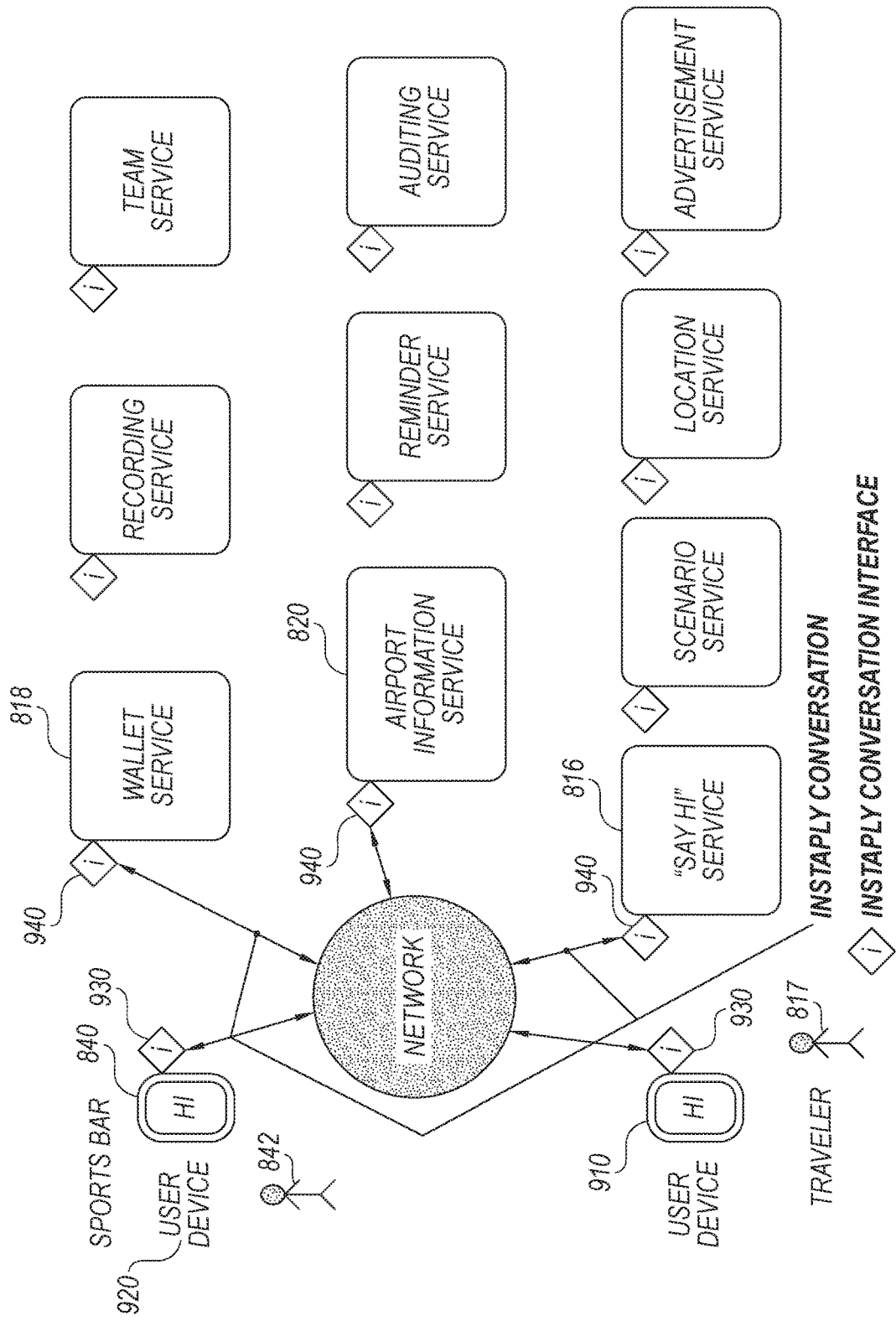
FIG. 9 illustrates interaction between devices and services within the system of the disclosed technology.

FIG. 9 illustrates interaction between devices and services within the system of the disclosed technology.

Traveler 817 has a mobile user device 910, which is enabled to interact with the rest of the devices and services in the system using client interface 930, which is responsible for attaching the device to the rest of the system. The interface supports system APIs necessary for transferring data from the user device to the rest of the system. An application hosted by the device uses the APIs to communicate, e.g., user ID, conversation ID, conversation fragments, network ID (e.g. IP and/or MAC addresses) and other information relevant to the interaction. For example, the application may initialize with user ID when the traveler logs onto the system. When the traveler starts a new conversation the application requests and receives a conversation ID, e.g., using Instantiate Blank process 360, which is associated with the traveler and his device. The application is enabled to store conversation IDs for a certain number of recent and/or open conversations, depending on the amount of memory available on the device. The application is also enabled to receive a conversation fragment using a conversation ID. In some implementations, the application is enabled to receive a conversation ID as a result of a search of a subset of user conversations, e.g. by text, names of other users, team composition, pictures, videos, time interval, etc. The application is also enabled to get team composition (graph) using a conversation ID.

Bar waiter 842 also has a communication device 920 with system interface 940. Device 920 interacts with the rest of the system in a manner very similar to device 910. Because the device belongs to a business, in some implementations it is allowed to interact with the system over a secure channel only. In other implementations, it is required to do a two-factor user authentication. In another implementation, it is enabled to use network and software interfaces with different levels of security requirements. For example, when user 842 participates in one conversation as a consumer and in another conversation as a member of a business team, the latter conversation is required to go over a secure channel.

Services 816, 818, 820 and others interact with the system using instances of Service Interface 940. The interface enables conversion of internal representations of service information to conversation format. For example, Airport Information Service 820 has information in HTML format. When interacting with the system of the disclosed technology it uses interface 940 to convert it to text format. In another example, Wallet Service 818 uses interface 940 to encrypt currency values before transferring it between different user and business team accounts.

FIG. 9 illustrates other types of services that are enabled to interact with the system of the disclosed technology. For example, Recording Service is added to the conversation to record interactions, either complete or partial, between parties in the conversation. Team Services keeps track of team composition and communications between team members. Reminder Service can be added to the conversation to send/receive/forward timed messages (conversation fragments) to conversation parties. Auditing Service is added to the conversation to keep track of value transactions and produce receipts. Scenario Service provides users with standard and customized scenarios for conversations. Location Service provides location, either physical or virtual, information to the conversation.

Figure 10:
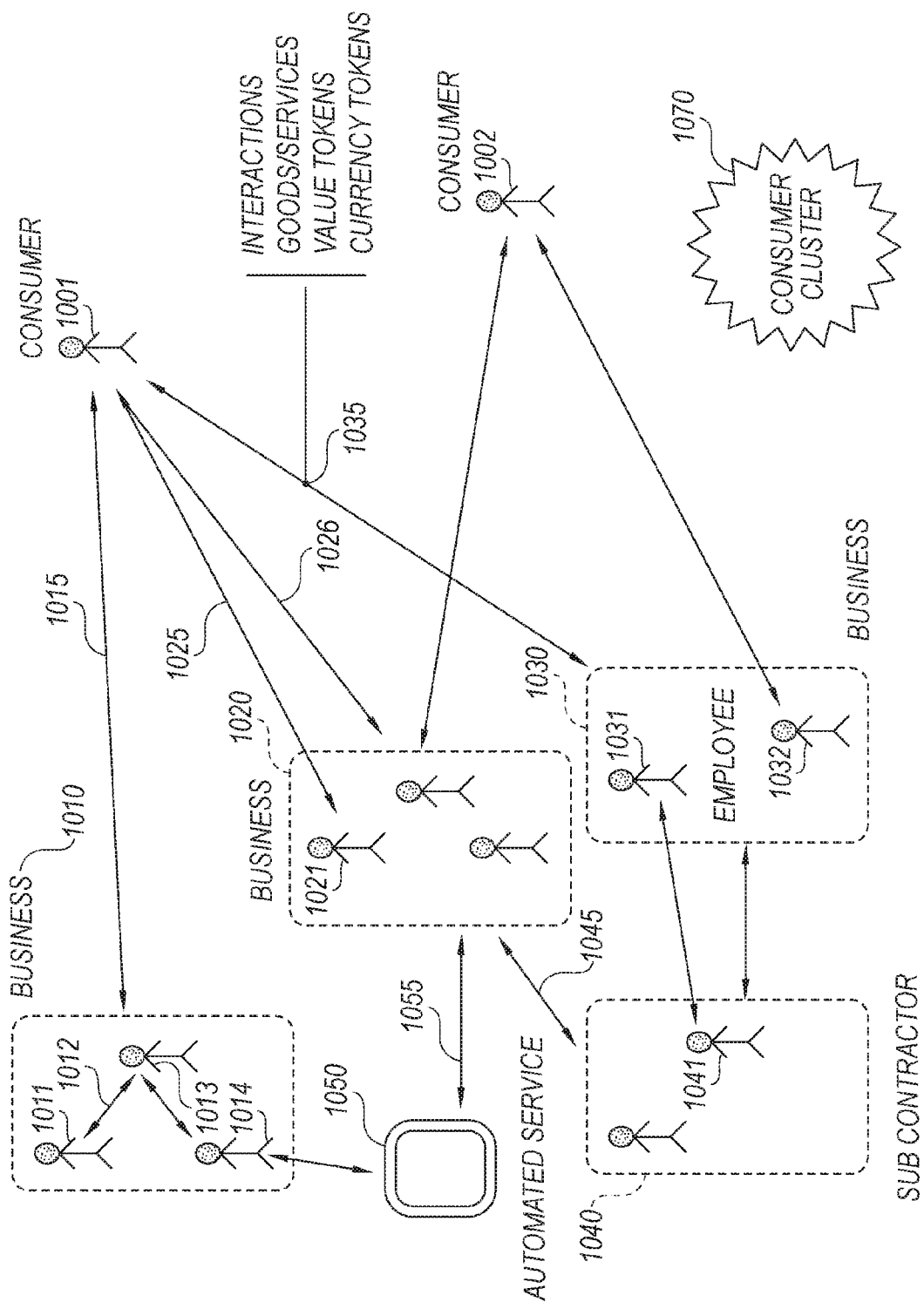
FIG. 10 illustrates a business graph enabled by the system of the disclosed technology.

Other services can be easily added to the system for originating, capturing, processing, augmenting, adding, and manipulating conversation fragments based on user, team, business, security, location, and other meta-information. In one embodiment, each fragment is assigned at least one semantic type, such as text, time, picture, money, etc. The interface uses the type to convert the fragment to its service's internal data type and back FIG. 10 illustrates business graph enabled by the system of the disclosed technology. The business graph captures information between conversation participants. For example, Consumer 1001 has a connection with Business team 1010. That is, the consumer doesn't know any of the team members (1011 . . . 1013) personally, but uses the business to discuss and buy goods from it. For example, the user may contact a take-out burger restaurant to order food using the system of the disclosed technology. Receptionist 1013 discusses the order with the customer and her team (e.g. sub-conversation 1012). To fulfill the order team member 1014 interacts with automated delivery service 1050.

In some scenarios, team 1010 is formed on a per-project basis. Nevertheless, the conversation contains contact information of the team members, so that any one or all of them can be contacted in the future, e.g. with customer complaints, project review, and other messages.

In other scenarios, team 1010 represents a formal organization, e.g. a sales department, customer support group, university faculty, etc.

On FIG. 10 conversations are represented by two-way arrows, e.g. 1015, 1025, 1026, 1035, 1045, 1055. Conversations may include, but not limited to digital interactions, transfer of goods and services, value tokens, currency tokens, as well as other types of consideration. Interactions may include representations about products, services, user preferences, and various states of affairs in the system. Interaction may also include directives, i.e. instructions from conversation participants to perform certain actions, such as value transfers, product transfers, orders, etc. Interactions may include comissive statements, such as promises, offers, and others. Interactions may also include expressive statements, such as complaints, thanks, apologies, etc. In addition, Interactions may include declarations, such as appointments, announcements, joint agreements, etc.

In the food order example above, Business team 1010 provides representations of plates and drinks on the menu. Consumer 1001 describes his preferences, asks for advice, and places orders. He also promises a payment, and thanks for the prompt service. Business team members can also place orders, e.g. to Sub-contractor 1045 and/or third party service 1050. They can promise transfer of currency and/or value tokens, e.g. coupons, loyalty points, etc.

In another example, Consumer 1001 interacts with Business 1020, e.g. insurance agency. He knows Employee 1021 personally and contacts him directly via connection 1025. As the conversation progresses, the consumer has to transfer money in return for a payment at a later date, e.g. for medical services from a third party. Although the relationship between the consumer and the employee is personal, the promise of payment 1026 is between the consumer and Business 1020. Both interactions (1025 and 1026) can be a part of the same conversation. The conversation can involve other employees of Business 1020.

By contrast, Consumer 1002 has only business relationship with team 1020. Nevertheless, he can proceed to create a conversation. In the process of the conversation he can establish a personal working relationship and next time contact a specific team member directly. When a specific employee leaves his/her team, the relationship remains with the team. A replacement employee is enabled to access the relationship and evaluate its characteristics.

Similarly, employees may or may not have direct, individual relationships with other employees. Nevertheless, they can do business with teams by locating them, e.g. by search, directory, or reference from other conversation participants. For example, relationship 1045 between business 1020 and sub-contractor 1040 is impersonal.

In another example, business Employee 1031 and Sub-contractor employee 1041 have a personal working relationship. When Consumer 1002 interacts with business 1030, which requires services of Sub Contractor 1040, Employee gets involved to facilitate the conversation. The involvement is implemented, e.g. by adding the employee to the conversation, either privately within his team or so that the consumer can see the employee's involvement. Various mechanisms to involve multiple parties in a conversation are discussed above, e.g. in relationship to FIG. 7.

Characteristics of a connection are stored in a memory, e.g. database service (not shown). Such characteristics may include absolute values, e.g. number of conversations between parties, number (volume) of product/service items transacted, amount of value tokens transferred, amount of currency payments transferred. In other implementations, characteristics include relative values, e.g. ratio between currency value of transactions and number of conversations; average of conversation fragments per conversation; ratio of goods/services per conversation, etc. The system is enabled to provide information and evaluate employee and/or team performance based on connection characteristics.

Similarly, a consumer in the system can be characterized by his/her connections, e.g. by automatically assigning priority conversations with higher ratios of currency value to a business. For example, when consumers 1001 and 1002 initiate conversation with business 1020, consumer 1001 is given a preference because he has a personal connection with employee 1021. Alternatively, the system may assign a higher priority to a new customer, e.g. because the connection with the existing customer has a value ratio below threshold. The system may identify consumers with high level of experience and include them in conversations when business team members are not available to provide advice, e.g. outside the office hours. Such consumers can be treated as virtual team members and provided with incentives to answer questions and transact with other consumers on behalf of the team.

In some implementations, connections are evaluated statistically over a population in at least one of the categories of employees, teams, businesses, organizations, consumers, etc. For example, Consumer Cluster 1070 is created by aggregating consumers using a calculated value of expected ratio of money spent per conversation. The cluster can be created and/or adjusted by evaluating connections between consumers in a third party social graph, e.g. Facebook, LinkedIn, Twitter, Google+ and other social networks.

In some implementations, external relationships are mapped to internal relationship and user identities ("friends") presented as internal and/or transparent for creating and exchanging messages.

Figure 11:
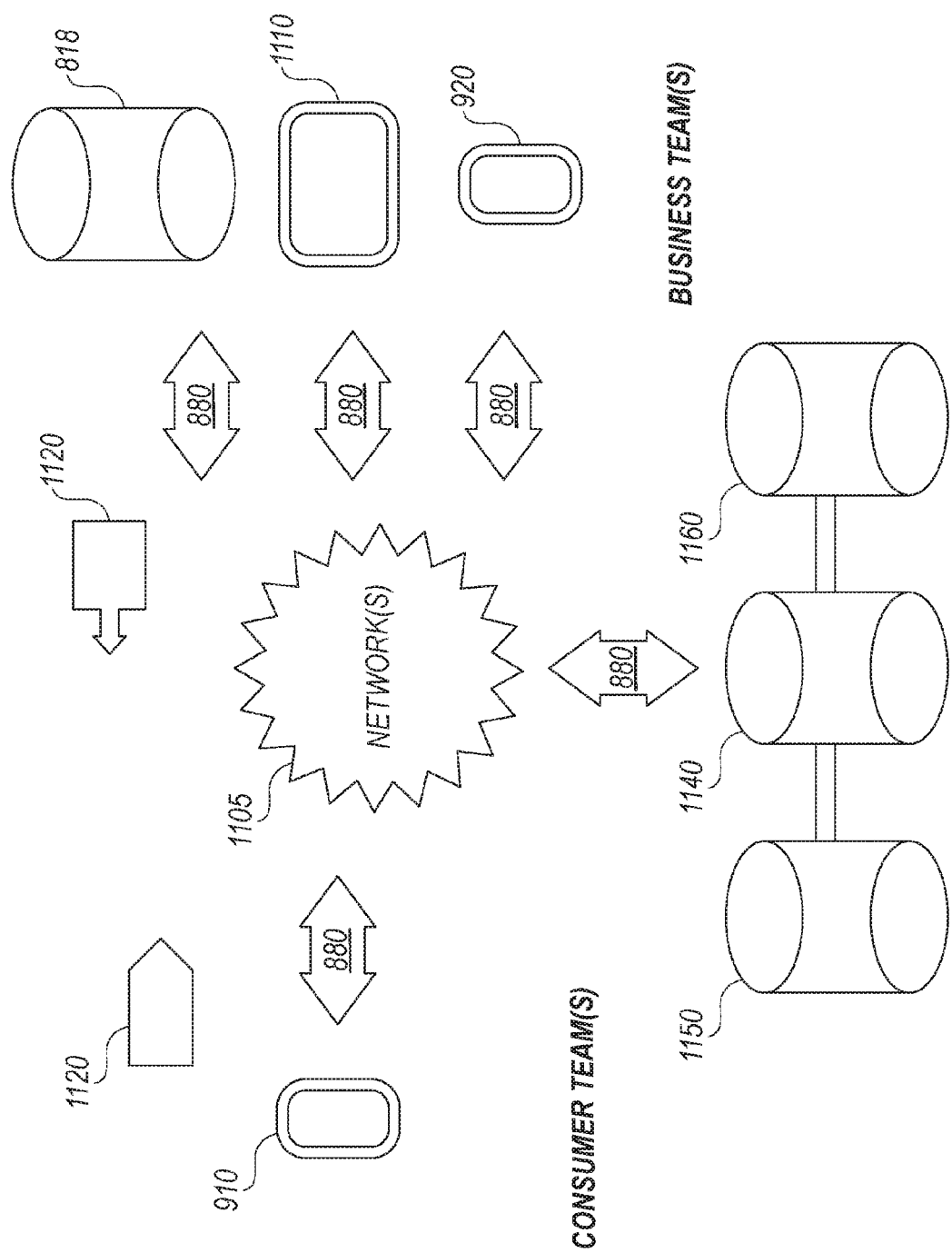
FIG. 11 illustrates a distributed network of goods, services, conversations, considerations and other transactions enabled by the system of the disclosed technology

FIG. 11 illustrates a distributed network of goods, services, conversations, considerations and other transactions enabled by the system of the disclosed technology.

User device 910 (see FIG. 9 discussion for more detail) initiates conversation 880 (see FIG. 8 discussion for more detail). Examples of user device include a smartphone, personal area network accessory such Google Glass, tablet, PC, laptop, Point-of-Sale terminal, TV, Set Top Box (STB), game console, GPS device, HVAC control panel, etc.

Conversation goes over Network 1105, e.g. the Internet and/or internal company network.

Fragments of the conversation 880 go another user device 920, tablet 1110, and data center 818, associated with a Wallet Service. Devices 920, 1110, and 818 are members of the same team, members of which can exchange conversations between themselves.

At the same time Conversation 880 is copied to memory 1140, which is associated with conversation evaluation service 1150 that computes and/or statistically predicts conversation ratios.

In some implementations, tablet 1110 belongs to a team supervisor who also has access to service 1150. The access is provided on a subscription or pay-per-use basis. The supervisor evaluates this and other conversations using a visual dashboard on tablet 1110 that shows performance of the team, e.g. measured in value generated and/or consumer satisfaction measurements received.

Conversation 880 results in an agreement. According to the agreement business sends goods 1120 to the user, while the user sends consideration, e.g. money, to the business. The consideration is directed to Service 818 and credited to the team. In some implementations, the user is enabled to divide the consideration between team members. For example, when giving a tip after a meal at a restaurant, the user allocates money between the cook, waiter, and kitchen staff.

To avoid bank fees, such as currency conversion, users are enabled to use internal credits in lieu of consideration and exchange the credits into preferred currency if necessary.

Service 1160 is used for discovery and routing conversations between users in the system. It contains real-time as well as historical information about the network; personal preferences and device configurations time of conversation. The service can be used for pre-configured standard scenarios, e.g. involved in secure conversations.

Figure 12:
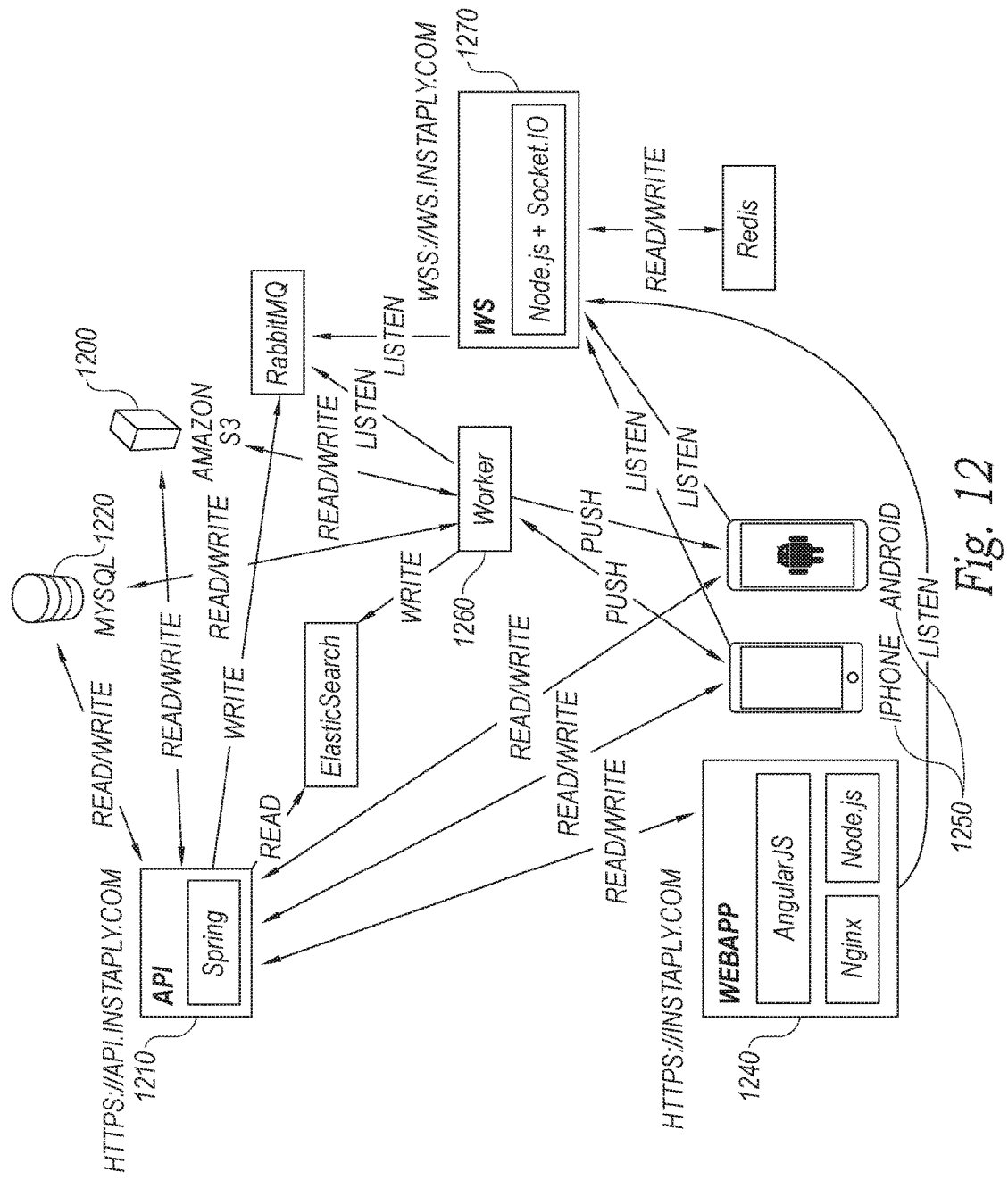
FIG. 12 is a diagram of a computer-enabled system that implements a conversation record keeping system in accordance with one embodiment of the disclosed technology.

FIG. 12 provides an example of a computer-enabled implementation of the disclosed technology. In one embodiment, a host server 1200 (that may be operated by a third party such as Amazon.com) runs a software program 1210 that stores records of communications between participants as conversations. The software program presents an API that allows users and third party systems/programs to provide fragments of conversations or (if allowed) to receive records of conversations. Records of conversations, the participants, attachments such as photographs, documents etc. and rules for who have access to the conversation are stored in a database 1220.

Users access a conversation using their personal computing device such a PC, laptop, gaming console, in-car computer system etc. 1240 or their personal smart phone 1250. Communications about a conversation can be sent directly to the hosting server through the API 1210. If another participant performs some task related to a conversation in which the user is involved, worker software 1260 operated by the server 1200 detects the communication and provides a notification to the user's computing device 1240, 1250.

A web application 1270 monitors communications from a user's or a conversation participant's computing device. If the communication is directed to a conversation, the web application notifies a messaging broker application such as RabbitMQ from Pivotal that allows communications to be sent and received from different applications. Documents, photographs, consideration etc. for a transaction that is the subject of a conversation can be sent between participants and messages confirming the transmission and receipt of such items are stored in the database 1220.

The software program 1210 also interfaces with the wallet exchange program (not shown) that is associated with conversation participants. In this manner, the software program 1210 confirms the transfer of consideration between participants in order to detect if a transaction has been completed and to keep records of a transaction.

In some cases, supervisors can access the database 1220 with their own computing device (not shown) to determine how a transaction is progressing. Such supervisors could be managers of a sales team, physicians monitoring their patients and nurses, insurance claim adjusters etc. A user can leave feedback regarding a conversation that is stored in the database and used by the supervisor to rate its sales team or improve future service.

If a user wishes to purchase a particular hardware item, a new conversation can be started between the user and an employee at a hardware store. The store is copied on the message and a supervisor can forward the message to another employee if the original employee is no longer working at the store. Records of the interactions that make up the conversation are stored on the database 1220. The user can complete a transaction from their computing device 1240, 1250 to initiate the transfer of consideration from their account to the hardware store using their wallet exchange. A record of the consideration transfer is kept on the database for return/exchange purposes. A supervisor can inspect all the transactions from a particular store to determine the effectiveness of its sales team, to spot trends in consumer purchases etc.

Once a user is registered with the system, the application 1210 keeps a record of an identification number for the user's computing device 1240, 1250 and messages to the user for a new or existing conversation are sent to the address of the computing device, The computing device is able to display the conversations by subject or other identifier so that the user is able to view all portions of a conversation as well as the underlying documents. In some cases, the database 1220 keeps track of items that need to be completed in order to finalize a transaction. For example, in home ownership a buyer may want to pre-qualify for a mortgage. Several papers are required to be provided to the bank in order to pre-qualify and the database can keep track of what papers have been provided and which are still outstanding. Other aspects of a home purchase such as an earnest money check, inspection sign off etc. can be shown to the participants so that the participants can easily view what steps are left to complete.

The checklist of documents required can be pre-determined based on the type of transaction that the user wants to complete. In addition, participants in the conversation may be able to add or subtract from the list of documents required based on the particular circumstances of the matter at hand.

On the user's computing device, communications to another conversation participant include an ID or other code that identifies the particular conversation. The ID or code is read by the web application 1270 to route the communication to the appropriate participants and to store a record of the communication in the database 1220. The user's computing device produces a user interface that lists individual conversations that the user is involved in or has completed. Be selecting a particular conversation, the computing device retrieves communications stored for that conversation. In addition, documents for the transaction associated with the conversation can also be retrieved or viewed as well as any checklist of items to be completed. The user interface allows a user to invite additional people or services into a conversation and to set rules for how much of the conversation the new participant is able to see.

From the foregoing, it will be appreciated that specific embodiments of the disclosed technology have been described herein for purposes of illustration, but that various modifications may be made without deviating from the scope of the disclosed technology. Accordingly, the disclosed technology is not limited except as by the appended claims.

We claim:

1. A method, comprising:
   facilitating message-based communications between two or more participants in a conversation associated with completing an underlying transaction,
      wherein the conversation is a group of message-based communications between the two or more participants, and
   receiving a notice from a participant in the conversation that payment has been transferred between participants via a message-based communication in order to complete the underlying transaction; and
   storing information associated with the received notice along with the facilitated message-based communications,
      wherein the stored information includes the message-based communication that completed the underlying transaction.

2. The method of claim 1, wherein at least one of the participants includes an automated service configured to send automated messages to another participant via the message-based communications.

3. The method of claim 1, wherein at least one of the participants associated with a transfer of payment between the parties includes an automated wallet service.

4. The method of claim 1, wherein the two or more participants associated with a transfer of payment between the parties includes a first participant, a digital wallet service associated with the first participant, and a service provider configured to provide a service to the first participant in response to completion of the underlying transaction.

5. The method of claim 1, wherein the two or more participants associated with a transfer of payment between the parties includes a first participant, a digital wallet service associated with the first participant, and a seller of a good configured to provide a good to the first participant in response to completion of the underlying transaction.

6. The method of claim 1, further comprising:
   storing, within the recorded information, a notification that identifies a conversation and an amount of payment transferred between participants in the conversation.

7. The method of claim 1, further comprising:
   storing, within the recorded information, feedback from a participant in a conversation about the underlying transaction.

8. The method of claim 1, wherein the message-based communications between the two or more participants include instant messages exchanged between the two or more participants.

9. The method of claim 1, wherein the message-based communications between the two or more participants include text messages exchanged between the two or more participants.

10. The method of claim 1, wherein the message-based communications between the two or more participants include messages without subject fields that are exchanged between the two or more participants.

11. A non-transitory computer-readable medium whose contents, when executed by a computing system, cause the computing system to perform a method, the method comprising:
    facilitating message-based communications between two or more participants in a conversation associated with completing an underlying transaction,
       wherein the conversation is a group of message-based communications between the two or more participants, and
    receiving a notice from a participant in the conversation that consideration has been transferred between participants via a message-based communication in order to complete the underlying transaction; and
    storing information associated with the received notice along with the facilitated message-based communications,
       wherein the stored information includes the message-based communication that completed the underlying transaction.

12. The non-transitory computer-readable medium of claim 11, wherein at least one of the participants includes an automated service configured to send automated messages to another participant via the message-based communications.

13. The non-transitory computer-readable medium of claim 11, wherein at least one of the participants associated with a transfer of consideration between the parties includes an automated wallet service.

14. The non-transitory computer-readable medium of claim 11, wherein the two or more participants associated with a transfer of consideration between the parties includes a first participant, a digital wallet service associated with the first participant, and a service provider configured to provide a service to the first participant in response to completion of the underlying transaction.

15. The non-transitory computer-readable medium of claim 11, wherein the two or more participants associated with a transfer of considerations between the parties includes a first participant, a digital wallet service associated with the first participant, and a seller of a good configured to provide a good to the first participant in response to completion of the underlying transaction.

16. The non-transitory computer-readable medium of claim 11, further comprising:
    storing, within the recorded information, a notification that identifies a conversation and an amount of consideration transferred between participants in the conversation.

17. The non-transitory computer-readable medium of claim 11, wherein the message-based communications between the two or more participants include instant messages exchanged between the two or more participants.

18. The non-transitory computer-readable medium of claim 11, wherein the message-based communications between the two or more participants include text messages exchanged between the two or more participants.

19. A method for facilitating completion of a transaction between multiple participants, the method comprising:

facilitating message-based communications between multiple participants in a conversation associated with completing an underlying transaction,
- wherein the conversation is a group of message-based communications between the two or more participants, and
- wherein the multiple participants include a buyer of a good or service, a seller of a good or service, and a delivery service associated with transferring the good or service from the seller to the buyer;

receiving a notice from a participant in the conversation that consideration has been transferred between the buyer and the seller via a message-based communication in order to complete the underlying transaction;

receiving notice from a participant in the conversation that a delivery instruction has been transferred between the seller and the delivery service; and storing information associated with the received notices along with the facilitated message-based communications,
- wherein the stored information includes the message-based communication that completed the underlying transaction.

20. The method of claim 19, wherein receiving a notice from a participant in the conversation that consideration has been transferred between the buyer and the seller via a message-based communication in order to complete the underlying transaction includes receiving a notice that one or more credits have been transferred from the buyer to the seller.

* * * * *